(12) United States Patent
Ikeda

(10) Patent No.: US 7,209,480 B2
(45) Date of Patent: Apr. 24, 2007

(54) BASE STATION APPARATUS, MOBILE TERMINAL APPARATUS AND WIRELESS ACCESS SYSTEM USING THE APPARATUSES

(75) Inventor: Shinkichi Ikeda, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 519 days.

(21) Appl. No.: 09/986,826

(22) Filed: Nov. 13, 2001

(65) Prior Publication Data

US 2002/0058480 A1 May 16, 2002

(30) Foreign Application Priority Data

Nov. 13, 2000 (JP) ........................ 2000-344788
Oct. 29, 2001 (JP) ........................ 2000-331738

(51) Int. Cl.
H04L 12/28 (2006.01)
H04L 12/66 (2006.01)
H04J 3/22 (2006.01)

(52) U.S. Cl. ................ 370/389; 370/469; 370/352
(58) Field of Classification Search ............. 370/338, 370/389, 328, 469, 352, 401; 709/320, 230
See application file for complete search history.

(56) References Cited

U.S. PATENT DOCUMENTS

| | | | |
|---|---|---|---|
| 5,673,322 A | 9/1997 | Pepe et al. | |
| 6,023,563 A | 2/2000 | Shani | |
| 6,091,733 A * | 7/2000 | Takagi et al. | 370/401 |
| 6,272,148 B1 * | 8/2001 | Takagi et al. | 370/469 |
| 6,418,128 B1 | 7/2002 | Takagi et al. | |
| 6,587,457 B1 * | 7/2003 | Mikkonen | 370/356 |
| 2002/0191576 A1 * | 12/2002 | Inoue et al. | 370/338 |
| 2003/0235206 A1 * | 12/2003 | Heller | 370/467 |
| 2005/0286458 A1 * | 12/2005 | Furukawa et al. | 370/315 |

FOREIGN PATENT DOCUMENTS

| | | |
|---|---|---|
| EP | 1045551 | 10/2000 |
| JP | 10336751 | 12/1998 |
| JP | 11-163946 | 6/1999 |
| JP | 11163947 | 6/1999 |
| JP | 11-507152 | 6/1999 |
| JP | 2000-101640 | 4/2000 |
| JP | 2000-324178 | 11/2000 |
| WO | 99 / 63702 | 12/1999 |
| WO | 99/63702 | 12/1999 |

OTHER PUBLICATIONS

G. Montenegro et al., "RFC 2757—Long Thin Networks", Jan. 2000.
P. Srisuresh et al., "RFC 2663—IP Network Address Translator (NAT) Terminology and Considerations", Aug. 1999.
Tanenbaum: "Computer Networks", 1996, Prentice Hall, pp. 310–317.

(Continued)

*Primary Examiner*—Duc Ho
(74) *Attorney, Agent, or Firm*—Greenblum & Bernstein, P.L.C.

(57) ABSTRACT

A base station serves as a relay node between a mobile terminal and an application server on a backbone network. The base receives a radio packet from the mobile terminal through a wireless I/F section, and transfers the radio packet to a IP processing section, a TCP input section and a protocol relay section successively in this order. At this point, with respect to the packet, the IP header is processed and then removed in the IP processing section, the TCP header is processed and then removed in a TCP processing section, and the data is transferred to a protocol relay section along with the TCP segment information described in both headers. The protocol relay section has a conversion table, and performs proxy processing based on the table.

11 Claims, 22 Drawing Sheets

OTHER PUBLICATIONS

R. Seifert, "The Switch Book", Jun. 1, 2001, pp. 524–526, pp. 530–531.
G. Montenegro et al., "RFC 2757—Long Thin Networks", Jan. 2000, XP 002182001.
P. Srisuresh et al., "RFC 2663—IP Network Address Translator (NAT) Terminology and Considerations", Aug. 1999, XP 002204216.

English Language Abstract of JP 10–336751.
English Language Abstract of JP 11–163947.
English Language Abstract of JP–163946.
English Language Abstract of 11–507152.
English Language Abstract of JP 2000–101640.
English Language Abstract of JP 2000–324178.

* cited by examiner

Prior Art

| Type | Priority |
|---|---|
| Binding Update | High |
| ICMP (ASSOCIATED WITH MIP) | Low |
| | |

BASE STATION APPARATUS, MOBILE TERMINAL APPARATUS AND WIRELESS ACCESS SYSTEM USING THE APPARATUSES

BACKGROUND OF THE INVENTION

1. Field of the Invention

The present inventor relates to a base station apparatus, mobile terminal apparatus and wireless access system using the apparatuses to perform a communication method which is used in a wireless internet access system where the base station and mobile terminal perform wireless communications to obtain the internet service and which is to achieve effective data transmission.

2. Description of the Related Art

Various studies have been performed to utilize over wireless mobile networks internet communication protocol TCP (Transmission Control Protocol)/IP (Internet Protocol) designed for use in cable fixed networks.

In particular, the greatest problem arising in applying TCP to wireless mobile networks is that TCP protocol detects network congestion due to TCP segment loss caused in a wireless channel of low quality, and that as a result, a TCP window is narrowed, thereby lowering throughput extremely.

In order to solve the above problem, Japanese Laid-Open Patent Publication HEI11-163947 and so on propose that a gateway apparatus on a boundary between cable communications and wireless communications divides the TCP link and performs TCP link control suitable for each link.

A conventional wireless internet access system will be described below with reference to FIGS. 1 and 2.

FIG.1 is a diagram illustrating a configuration of the conventional wireless internet access system, where "11" denotes a mobile terminal, "12" denotes abase station apparatus, "13" denotes a getaway that has control over a plurality of base station apparatuses 12, and "14" denotes a network that accommodates mobile terminal 11, base station apparatuses 12 and getaway 13.

FIG. 2 is a diagram illustrating a configuration of the gateway apparatus in the conventional wireless internet access system, where "20", denotes the gateway apparatus, "22" denotes a cable TCP processing section (CTCP) comprised of TCP output section (TCPOS) 23 and TCP input section (TCPIS) 24, "25" denotes a wireless TCP processing section (WTCP) having wireless TCP output section (WTCPOS) 26 and wireless TCP input section (WTCPIS) 27, "21" denotes a TCP relay section for performing a data relay between cable TCP processing section 22 and wireless TCP processing section 25, "28" denotes an IP processing section comprised of IP output section (IPOS) 29, IP input section (IPIS) 31 and IP relay section (IPRS) 30 for performing a data relay between the sections 29 and 31, and "32" denotes an I/F (Interface) section.

Mobile terminal 11 connects a TCP link to a server not shown on network 14, and performs an internet access. At this point, in FIG. 1, between mobile terminal 11 and gateway 13 is connected a TCP link with parameters suitable for a wireless channel of low quality, between gateway 13 and the server is connected a conventional TCP link, and gateway 13 performs the relay between mobile terminal 11 and the server, and thereby intends to suppress the extreme deterioration on throughput.

Specific TCP relay processing will be described with reference to FIG. 2. When an arbitrary TCP segment reaches gateway apparatus 20 through I/F section 32, the segment is output to IP input section 31 to be assigned processing of either cable TCP processing 22 or wireless TCP processing section 25. In other words, when being input from network 14, the TCP segment is transferred to cable TCP input section 24, while being transferred to wireless TCP input section 27 when being input from base station apparatus 12.

Then, TCP relay section 21 performs the processing on the TCP segment so that the segment received from base station apparatus 12 is transferred to network 14, while the segment received from network 14 is transferred to base station 12 apparatus. TCP relay section 21 constructs a table with combinations of a sender and a destination IP address and of the sender and a destination TCP port, and thereby performs the relay processing on the TCP segment while uniquely identifying all the TCP links.

In the above conventional example, a plurality of TCP processing sections (cable TCP processing section 22 and wireless TCP processing section 25) has one IP processing section 28, which changes an IP address of a terminal at the time the terminal moves between subnets, using a mobile IP protocol such as Mobile IP.

However, in the above wireless internet access system, since the concept of subnets in IP is applied to wireless networks with frequent movements, inconvenience described below are apparently caused. That is, mobile terminal 11 should set an IP address belonging to a subnet that base station apparatus 12 disposes on the wireless channel, and therefore change the IP address at the same time as performing handover between subnets.

When it is considered that in the feature the widespread use of IPv6 will expand an IP address space, expected is an environment where a fixed IP address is assigned to each terminal, and a local LAN (for example, vehicle LAN) is constructed by connecting the mobile terminals over a wireless or cable link. In this case, the frequent IP address update due to the movement increases a processing load on a mobile terminal including LAN, A high incidence of handover is predicted in a spot communication system such as a high-speed large-capacity EHF (Extremely High Frequency) access system expected to be put in widespread use in the future, whereby the above-described problem is serious in particular in such a system.

SUMMARY OF THE INVENTION

It is a first object of the present invention to provide a base station apparatus, mobile terminal apparatus and wireless access system using the apparatuses capable of eliminating overhead in changing an IP address in a wireless internet access, improving a throughput, and reducing a processing time required to change the IP address due to handover or the like.

The present invention provides the base station with an IP relay function as well as TCP relay function, so that the base station performs processing for acting as a proxy of a mobile terminal that the base station accommodates. The mobile terminal accesses to the base station using a fixed IP address, while the base station operates the IP proxy function to perform proxy transmission and reception using an IP address accessible to the outside. Concurrently, the TCP relay function divides the TCP link into a wireless channel and a cable channel and performs link control suitable for each channel, whereby the above object is achieved.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Figure 1:
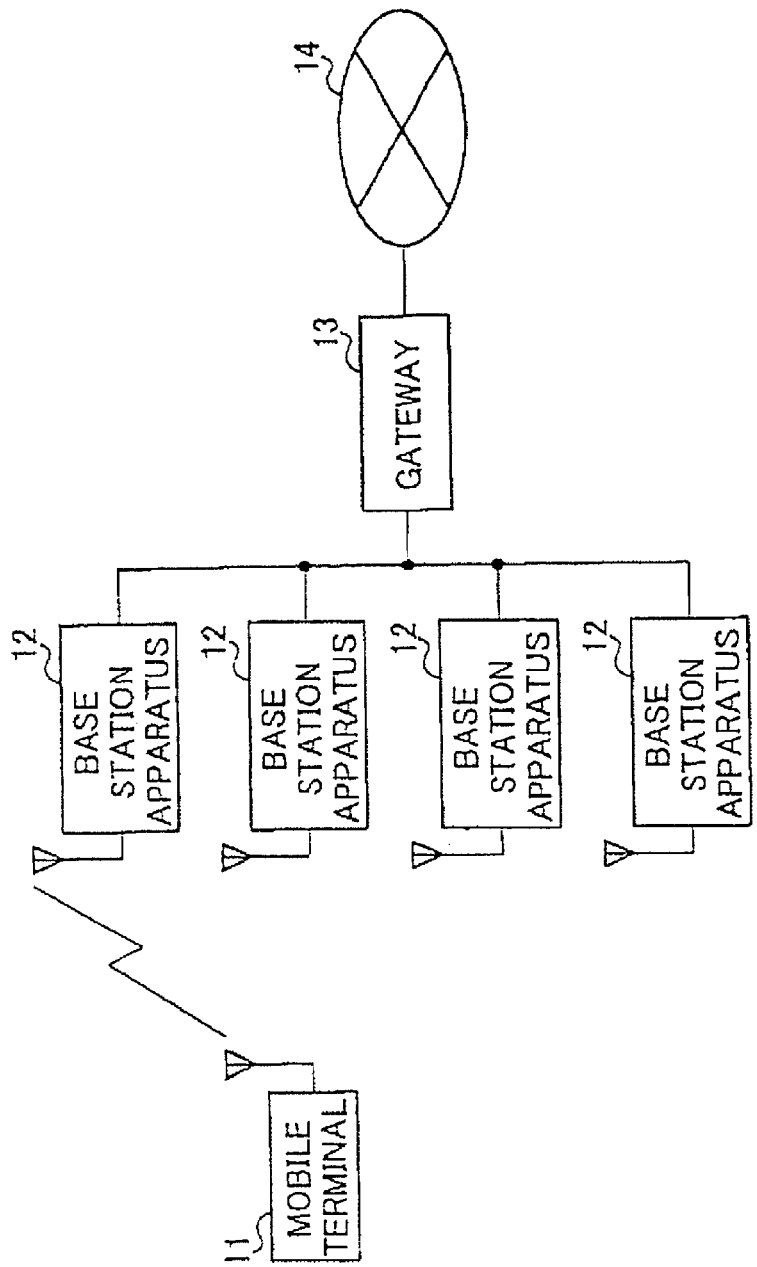
FIG. 1 is a diagram illustrating a configuration of a conventional wireless internet access system.
Figure 2:
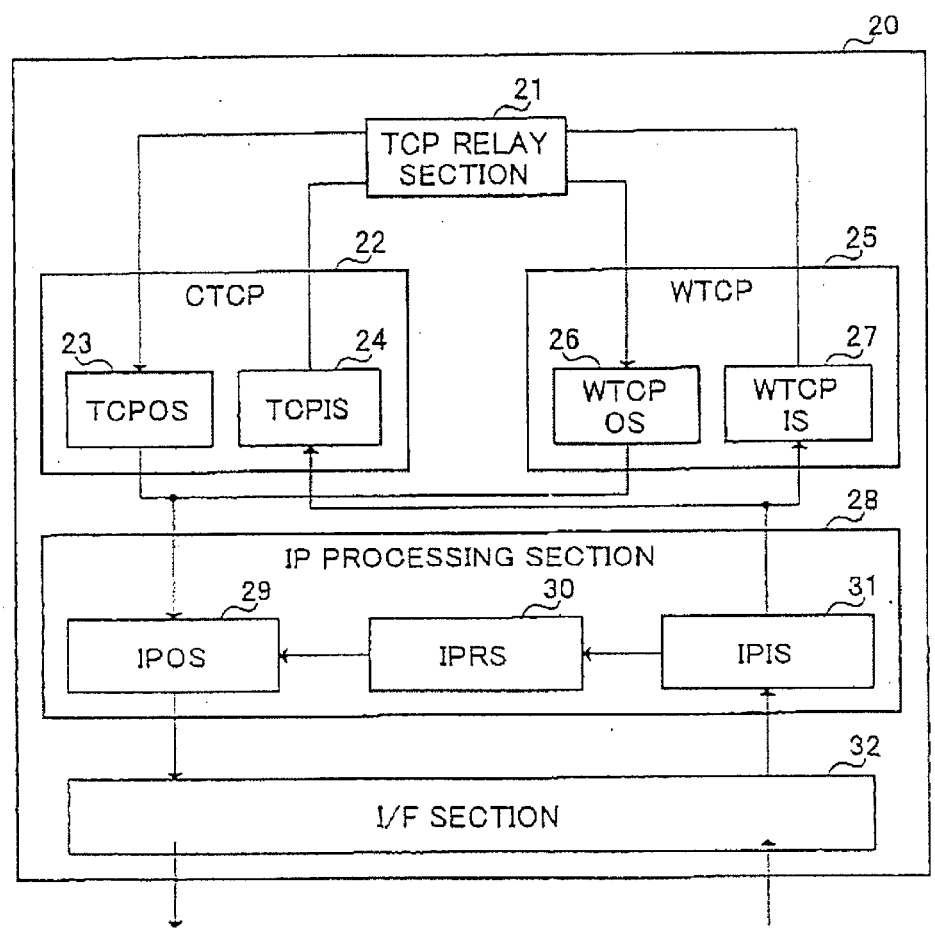
FIG. 2 is a diagram illustrating a configuration of a gateway apparatus in the conventional wireless internet access system.

A base station apparatus of the present invention performs wireless communications with a mobile terminal apparatus, while relaying the connection between the mobile terminal apparatus and internet, and adopts a configuration provided with a wireless section that communicates radio signals with the mobile terminal apparatus, and a protocol relay section that performs proxy processing on the network layer or transport layer of OSI layer model.

According to this configuration, by performing the proxy processing on the transport layer, it is made possible to divide the TCP link into a wireless network region and a cable network region and to perform the link control suitable for each region. Further by performing the proxy processing on the network layer, it is made possible for the mobile terminal that desires to access to the internet via a wireless channel to achieve the access without the base station instructs a change in IP address. In other words, the terminal apparatus is capable of accessing to a server over the network through the base station without changing the predetermined IP address. In this way the processing time required to change the IP address is reduced, and the handover time is also shortened.

A base station apparatus of the present invention adopts a configuration further provided with a propagation state measuring section that measures a radio signal propagation state in the wireless communications with the mobile terminal apparatus, and a transport layer parameter determining section that determines a transmit control parameter value of the transport layer protocol based on the measurement in the propagation state measuring section.

According to this configuration, the TCP link control parameter value of the wireless network region is changed to be set dynamically according to the propagation state such as a received electric field strength, thereby improving the throughput.

A mobile terminal apparatus of the present invention performs wireless communications with a base station apparatus, while relaying the connection between the base station apparatus and the internet, and adopts a configuration provided with a wireless section that communicates radio signals with the base station apparatus, and a protocol relay section that performs proxy processing on the network layer or transport layer of OSI layer model.

According to this configuration, when a mobile-terminal-side local network (mobile LAN) is constructed using as a gateway the mobile terminal for performing wireless communications with the base station, the proxy processing on the transport layer and network layer provided in the mobile terminal as the gateway accommodates the change in the IP address due to the movement, and it is there by possible to maintain the access without the change in the IP address affects LAN.

A mobile terminal apparatus of the present invention adopts a configuration further provided with a propagation state measuring section that measures a radio signal propagation state in the wireless communications with a base station apparatus, and a transport layer parameter determining section that determines a transmit control parameter value of the transport layer protocol based on the measurement in the propagation state measuring section.

According to this configuration, the TCP link control parameter value of the wireless network region is changed to be set dynamically according to the propagation state such as a received electric field strength, thereby improving the throughput.

A wireless access system of the present invention includes one or more mobile terminal apparatuses that perform wireless communications with one or more base station apparatuses, and adopts a configuration where the base station apparatus has a wireless section that communicates radio signals with the mobile terminal apparatus, and a protocol relay section that performs proxy processing on the network layer or transport layer in OSI layer model, while the mobile terminal apparatus has a first protocol processing section that processes the network layer protocol or transport layer protocol in OSI layer model.

According to this configuration, using a mobile terminal apparatus with a conventional TCP/IP protocol stack and a base station apparatus that performs the proxy processing, it is possible to construct a wireless internet access system that eliminates the need of changing the IP address in the mobile terminal apparatus.

A wireless access system of the present invention includes one or more mobile terminal apparatuses that perform wireless communications with one or more base station apparatuses, and adopts a configuration where the mobile terminal apparatus has a wireless section that communicates radio signals with the base station apparatus, and a protocol relay section that performs proxy processing on the network layer or transport layer of OSI layer model, while the base station apparatus has a second protocol processing section that processes the network layer protocol or transport layer protocol in OSI layer model.

According to this configuration, using a base station apparatus with a conventional TCP/IP protocol stack and a mobile terminal apparatus that performs the proxy processing, it is possible to construct a wireless internet access system that eliminates the need of changing the IP address in the mobile LAN.

The base station apparatus of the present invention adopts a configuration further provided with a protocol processing section that processes the network layer protocol or transport layer protocol in OSI layer model, and a processing selecting section that selects either the protocol relay section or the protocol processing section corresponding to a type of the mobile terminal apparatus to instruct the processing for the mobile terminal apparatus.

According this configuration, in order not to apply the proxy processing to a mobile terminal enabling fast address switching corresponding to mobile IP such as Mobile IP, the execution of the proxy processing is selected corresponding to the type of the mobile terminal. It is thereby possible to overcome inconveniences occurring when the proxy processing is applied to a service for specifying the mobile terminal in particular with the IP address, for example, such as a problem of mismatch of the IP address.

A wireless access system of the present invention is comprised of a base station apparatus provided with a wireless section that communicates radio signals with mobile terminal apparatuses, a first protocol relay section that performs proxy processing on the network layer of OSI layer model, a second protocol relay section that performs proxy processing on the transport layer of OSI Reference Model, and a processing selecting section that selects either the first protocol relay section or the second protocol relay section corresponding to a type of the mobile terminal apparatus to instruct the processing for the mobile terminal apparatus, a first mobile terminal apparatus provided with a wireless section that communicates radio signals with the base station apparatus, and a third protocol relay section that performs proxy processing on the network layer or transport layer of OSI layer model, and a second mobile terminal provided with a protocol processing section that processes a network layer protocol or a transport layer protocol in OSI layer model.

According to this configuration, even in an environment where mobile terminals coexist one of which provides a conventional TCP/IP protocol stack and another one of which performs the proxy processing, by disposing a base station apparatus capable of selecting the proxy processing, it is possible to construct a wireless internet access system capable of providing access environments corresponding to characteristics of the mobile terminal.

A base station apparatus of the present invention adopts a configuration provided with a receiving section that determines whether or not to relay on a data link layer to a cable network a received packet of radio signal including information to identify whether or not to instruct a relay on the data link layer, and a transmitting section that transmits the packet to the cable network according to the determined result.

A base station apparatus of the present invention adopts a configuration where the receiving section is provided with a header extracting section that extracts a header from the packet received on the data link layer, a header interpreting section that interprets the header to determine whether or not the header includes an instruction for relaying the packet on the data link layer, and an output switching section that outputs the received packet to the transmitting section on the data link layer when the determined result is indicative of the instruction for relaying the packet on the data link layer.

According to this configuration, the communication terminal apparatus adds a header for instructing to relay a packet on the data link layer to the packet to transmit, while the base station apparatus interprets the header of the packet, and relays the packet on the data link layer, whereby the need is eliminated of performing processing on or above the transport layer, and it is thereby possible to reduce the overhead and to shorten a packet transmit time.

A base station apparatus of the present invention adopts a configuration further provided with a relay section that performs packet relay processing on the layer above the data link layer, where the output switching section outputs the packet to the relay section when the determined result in the header interpreting section is not indicative of an instruction for relaying the packet on the data link layer.

According to this configuration, the header of the packet transmitted from the communication terminal apparatus is referred, information for instructing a layer on which the relay processing is performed is extracted, and according to the instruction, the layer on which the packet is relayed is determined, whereby the need is eliminated of referring to a header of a packet for each layer to determine whether or not to relay, and it is thereby possible to decrease a load of the packet relay processing.

A base station apparatus of the present invention adopts a configuration further provided with a transport layer processing section that performs processing on the transport layer, where the header interpreting section determines a type of data of payload of the received packet from the header, and when the determined result is indicative of data of the transport layer, the output switching section outputs the packet to the transport layer processing section, According to this configuration, with respect to the relay of a packet with the payload of data of the transport layer, it is determined whether or not to process the packet on the transport layer from the contents of the header interpreted on the data link layer to process the packet, whereby it is not necessary to interpret the header on the transport layer, and it is thereby possible to decease a load of the packet processing.

A base station apparatus of the present invention adopts a configuration where the header interpreting section determines information on priority on transfer of the received packet from the header, and the output switching section outputs packets according to the priority.

According to this configuration, the base station apparatus is capable of determining the relay order of packet from the interpreted result on the header, and of preferentially relaying a packet with a high priority.

A base station apparatus of the present invention adopts a configuration where the receiving section has a composing section that composes packets per unit processing on the network layer from the received packet, and the output switching section outputs the packets composed in the composing section to the transmitting section on the data link layer.

According to this configuration, It is possible to compose packets divided in transmitting radio signals thereof into packets per unit processing on the network layer.

A communication terminal apparatus of the present invention adopts a configuration provided with a header generating section that adds an instruction for relaying a packet on the data link layer to a header, and a transmitting section that transmits the packet including the header as a radio signal.

According to this configuration, the communication terminal apparatus adds the instruction for relaying a packet on the data link layer to a header to transmit, while the base station apparatus interprets the header of the packet, and relays the packet on the data link layer, whereby the need is eliminated of performing processing on or above the transport layer, and it is thereby possible to reduce the overhead and to shorten a packet transmit time.

A communication terminal apparatus of the present invention adopts a configuration further provided with a detecting section which detects that the type of data of payload of a packet to transmit is data of the transport layer, where the header generating section adds the detected result to the header as information on the type of the data of the payload.

According to this configuration, with respect to the relay of a packet with the payload of data of the transport layer, the base station apparatus determines whether or not to process the packet on the transport layer from the contents of the header interpreted on the data link layer to process the packet, and thereby does not need to interpret the header on the transport layer, whereby it is possible to decease a load of the packet processing.

A communication terminal apparatus of the present invention adopts a configuration where the header generating section adds to the header a priority of packet transfer in the base station apparatus according to the contents of a packet to transmit.

According to this configuration, the base station apparatus is capable of determining the relay order of packet from the interpreted result on the header, and of preferentially relaying a packet with a high priority.

A communication terminal apparatus of the present invention adopts a configuration further provided with a dividing section that divides a packet of unit processing on the network layer into packets each of unit processing on or below the data link layer, where the transmitting section transmits packets divided in the dividing section.

According to this configuration, it is possible to obtain a size of a packet suitable for transmitting as a radio signal.

In a communication method of the present invention, a transmitting-side apparatus adds to a header an instruction for relaying a packet on the data link layer and transmits a radio signal of the packet with the header added thereto, while a receiving-side apparatus receives the radio signal to extract the packet, and interprets the header of the extracted packet. Then, only when the header has the instruction for relaying the packet on the data link layer, the receiving-side apparatus composes a protocol service data unit from the packet, and relays the composed protocol service data unit on the data link layer to transmit to a cable network layer.

According to this method, the communication terminal apparatus adds the instruction for relaying a packet on the data link layer to a header to transmit, while the base station apparatus interprets the header of the packet, and relays the packet on the data link layer, whereby the need is eliminated of performing processing on or above the transport layer, and it is thereby possible to reduce the overhead and to shorten a packet transmit time.

(First Embodiment)

The first embodiment will be described with reference to FIGS. 3 to 10.

Figure 3:
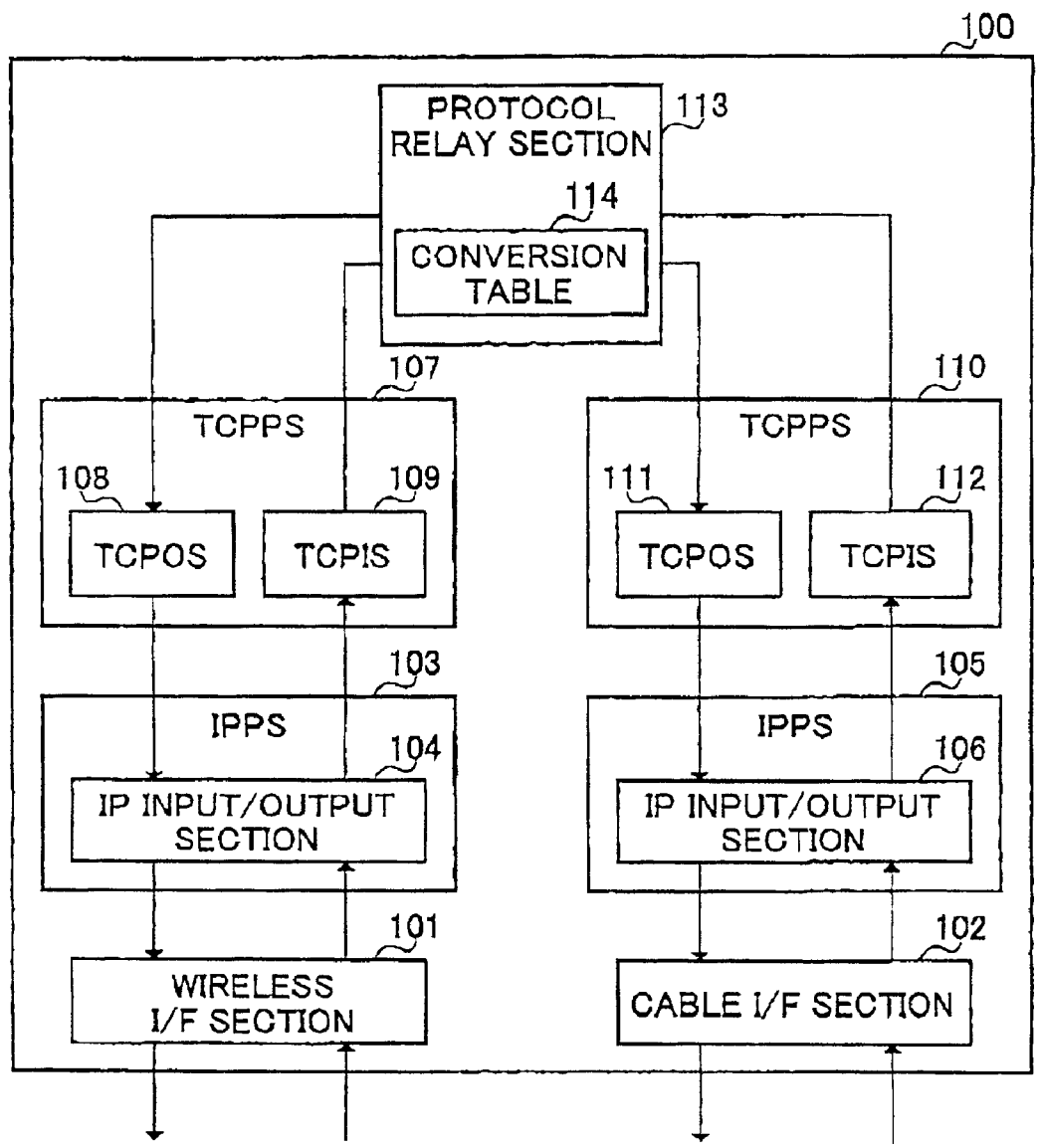
FIG. 3 is a diagram illustrating a configuration of a base station apparatus of the present invention.

FIG. 3 is a diagram illustrating a configuration of a base station apparatus of the present invention. In FIG. 3, "100" denotes the base station apparatus, "101" denotes a wireless I/F section, "102" denotes a cable I/F section, "103" denotes an IP processing section (IPPS) having IP input/output section 104 connected to wireless I/F section 101, "105" denotes an IP processing section (IPPS) having IP input/output section 106 connected to cable I/F section 102, "107" denotes a TCP processing section (TCPPS) on a wireless network side having TCP output section (TCPOS) 108 and TCP input section (TCPIS) 109 each connected to IP input/output section 104, "110" denotes a TCP processing section (TCPPS) on a cable network side having TCP output section (TCPOS) 111 and TCP input section (TCPIS) 112 each connected to IP input/output section 106, and "113" denotes a protocol relay section which controls TCP segment relay between TCP processing section 107 and TCP processing section 110 and which has conversion table 114 associated with TCP port and IP address.

Figure 4:
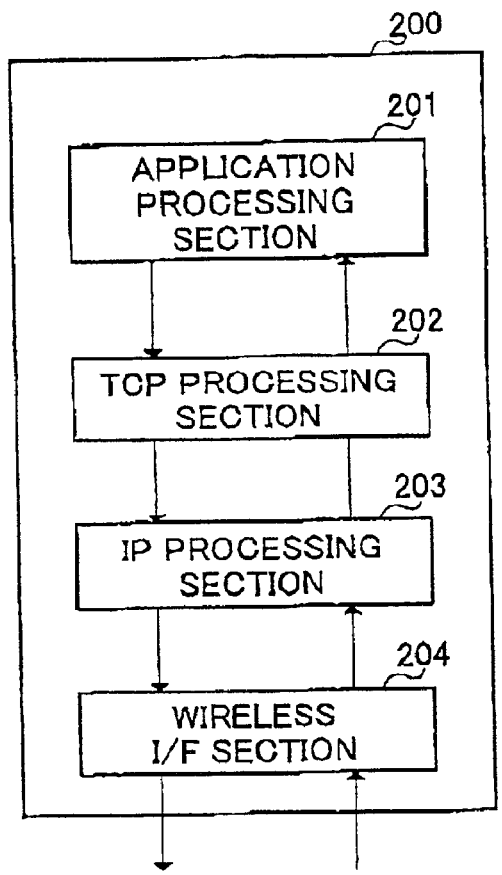
FIG. 4 is a diagram illustrating a configuration of a mobile terminal apparatus of the present invention.

FIG. 4 is a diagram illustrating a configuration of a mobile terminal apparatus of the present invention. In FIG. 4, "200"

denotes the mobile terminal apparatus, "201" denotes an application processing section, "202" denotes a TCP processing section, "203" denotes an IP processing section, and "204" denotes a wireless I/F section.

Figure 5:
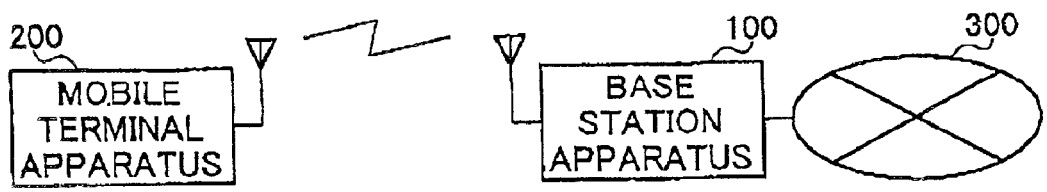
FIG. 5 is a diagram illustrating a wireless access system of the present invention.

FIG. 5 is a diagram illustrating a configuration of a wireless access system of the present invention. In FIG. 5, "200" denotes the mobile terminal apparatus, "100" denotes the base Station apparatus, and "300" denotes a backbone network.

Figures 6, 7:
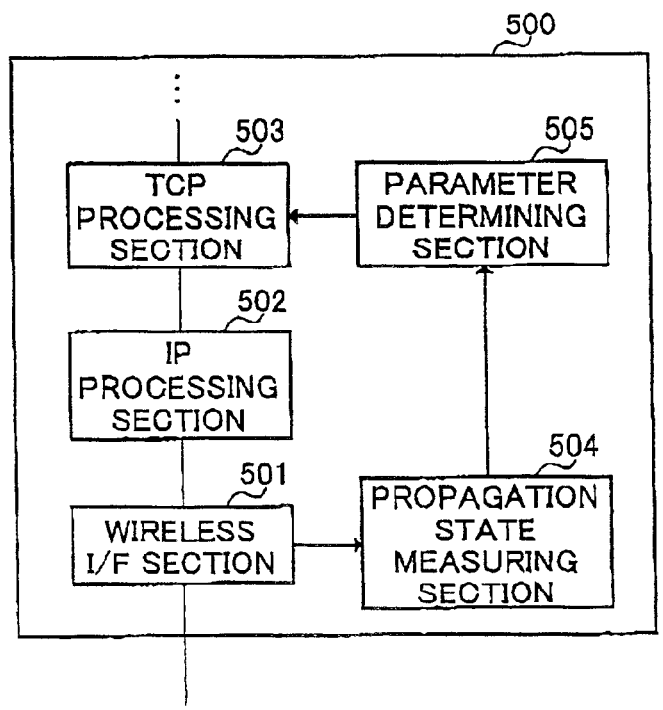
FIG. 6 is a diagram illustrating an example of a configuration of a conversion table provided in the base station apparatus of the present invention.
FIG. 7 is a diagram to explain functions with which is provided the base station apparatus or mobile terminal apparatus of the present invention.

FIG. 6 is a diagram illustrating an example of a configuration of the conversion table provided in base station apparatus 100 of the present invention. In FIG. 6, "114" denotes the conversion table, "401" denotes an IP address column, "402" denotes a TCP port column, "403" denotes an IP address column for wireless network, "404" denotes an IP address column for cable network, "405" denotes a TCP port column for wireless network, "406", denotes a TCP port column for cable network, and "407" denotes an entry.

In this embodiment FIG. 7 is used as a diagram to explain functions with which is provided base station apparatus 100 of the present invention. In FIG. 7, "500" denotes the base station apparatus which is equal to base station apparatus 100 illustrated in FIG. 3, "503" denotes the TCP processing section, "502" denotes the IP processing section, and "501" denotes the wireless I/F section, while the sections 503, 502 and 501 are respectively equal to TCP processing section 107, IP processing section 103 and wireless I/F section 101 each illustrated in FIG. 3. "504" denotes a propagation state measuring section and "505" denotes a parameter determining section.

Figure 8:
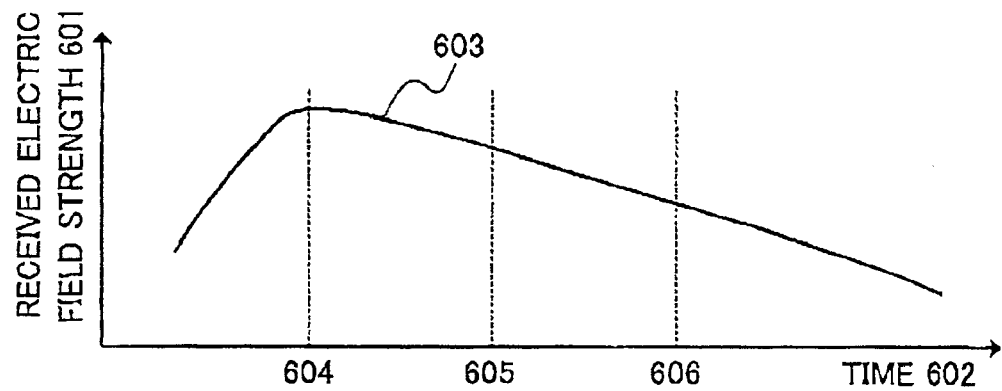
FIG. 8 is a diagram illustrating a transition of electric field strength with movement distance measured in the base station apparatus of the present invention.

FIG. 8 is a diagram illustrating a transition of electric field strength with movement distance measured in the base station apparatus of the present invention. In FIG. 8, "601" denotes the ordinate indicative of received electric field strength, "602" denotes the abscissa indicative of time, "603" denotes a transition of received electric field strength, and "604", to "606" denote lines for use in indicating the received electric field and time.

Figure 9:
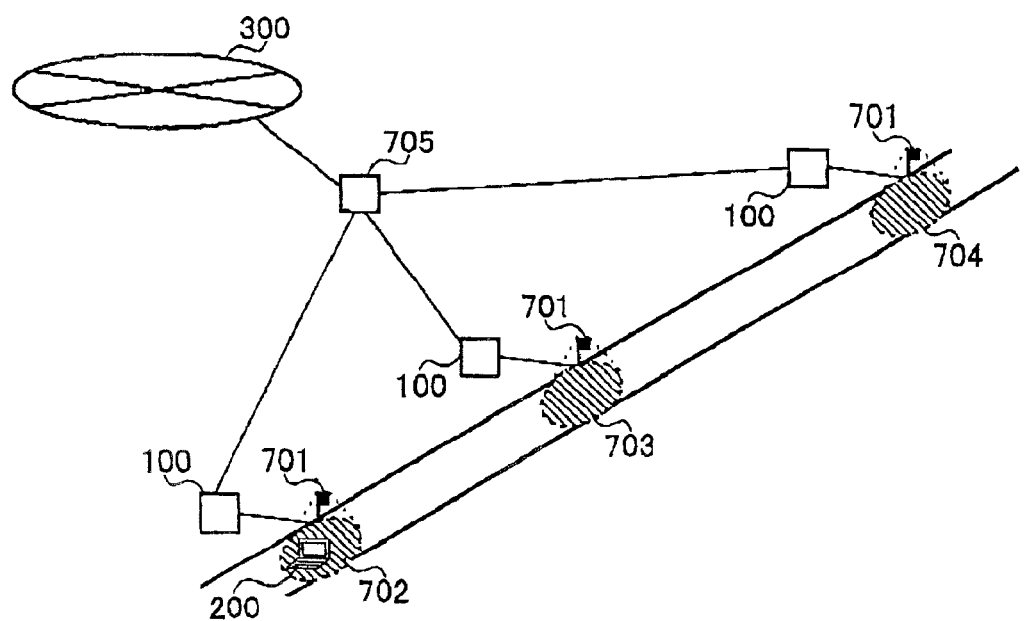
FIG. 9 is a diagram to explain functions with which is provided the mobile terminal of the present invention.

FIG. 9 is a diagram to explain an application example of the wireless access system of the present invention. In FIG. 9, "200" denotes the mobile terminal, "100" denotes the base station apparatus, "701" denotes a base station antenna, "702" to "704" denote wireless communication areas each formed by each of base station antenna 701, "705" denotes a route control station to accommodate base station apparatuses 100, and "300" denotes a backbone network to accommodate route control station 705.

Figure 10:
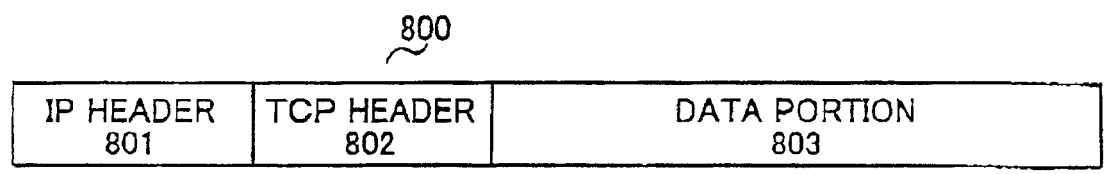
FIG. 10 is a diagram illustrating a configuration of a packet transferred between an IP processing section of upper layer and an I/F section of each of the mobile terminal apparatus and base station apparatus in the wireless access system of the present invention.

FIG. 10 is a diagram illustrating a configuration of a packet transferred between an IP processing section of upper layer and the I/F section of each of mobile terminal apparatus 200 and base station apparatus 100 in the wireless access system of the present invention. In FIG. 10, "800" denotes a packet, "801" denotes an IP header, "802" denotes a TCP header, and "803" denotes data, more specifically, TCP payload.

The operation in the above configurations will be described. In communication terminal apparatus 200, an application directly or indirectly uses respective protocols of TCP processing section 202 and IP processing section 203, and performs wireless communications with base station apparatus 100 through wireless I/F section 204. Base station apparatus 100 serves as a relay node between mobile terminal apparatus 200 and an application server not shown connected to backbone network 300, and transfers a radio packet received from mobile terminal apparatus 200 through wireless I/F section 101 to IP processing section 103, TCP input section 109 and protocol relay section 113 successively in this order. At this point, with respect to packet 800, IP header 801 is processed and then removed in IP processing section 103, TCP header 802 is processed and then removed in TCP processing section 107, and data 803 is transferred to protocol relay section 113 along with IP header information such as an IP address described in the header 801 and TCP header information such as a TCP sequence number described in the header 802.

Protocol relay section 113 has conversion table 114, and based on the table, performs proxy processing. An example of a basic configuration of conversion table 114 and the proxy processing will be described with reference to FIG. 6.

In each entry are described a pair of IP addresses applied to mobile terminal apparatus 200 on a wireless and cable network (403 and 404, respectively) and a pair of TCP ports applied on the wireless network and cable network (405 and 406, respectively). For example, with respect to entry 407, mobile terminal apparatus 200 is set for 10.0.100.5 as a fixed IP address, and using the IP address, accesses to the internet. In addition, while FIG. 6 illustrates a case of using IPv4 addresses as an IP address, using IPv6 addresses may provide the same operation without any modification in the configuration.

At the same time, mobile terminal apparatus 200 is trying to access through TCP port 9833. In base station apparatus 100, in response to the access from mobile terminal apparatus 200, protocol relay section 113 primarily having the TCP/IP relay function assigns IP address 192.168.6.113 and TCP port 1155 usable on a subnet to which base station apparatus 100 belongs to update conversion table 114, and then transmits the packet through TCP processing section 110, IP processing section 105 and cable I/F section 102 on the side of the wire network to backbone network 300. At this point, TCP processing section 110 adds TCP header 802 that is converted based on conversion table 114, and IP processing section 105 adds header 801 that is converted similarly, to the packet.

Basic changing portions include at least port number field in TCP header 802 where wireless network port number 405 and cable network port number 406 are replaced mutually, and an IP address field in IP header 801 where wireless network address 403 and cable network address 404 are replaced mutually. In addition with respect to the replacement in the IP address field, a sender IP address field undergoes the replacement on a packet transmitted from a mobile terminal apparatus, while a destination IP address field undergoes the replacement on a packet to transmit to a mobile terminal apparatus.

When there is an access from mobile terminal apparatus 200 as to which conversion table 114 does not have an entry, an IP address and TCP port of the cable network are newly assigned and registered with conversion table 114. The assignment of the IP address may be performed according to DHCP (Dynamic Host Configuration Protocol) or the stateless address autoconfiguration mechanism in IPv6 standard, and is not limited particularly. What is important is that protocol relay section 113 in base station apparatus 100 achieves as a proxy an actual communication IP address for mobile terminal apparatus 200 to set for conversion table 114.

Meanwhile, when a packet is received from network 300, the received packet is transferred through cable I/F section 102, IP processing section 105 and TCP processing section 110 to protocol relay section 113. When the packet matches in cable network columns (404 and 406) an entry registered with conversion table 114, the packet is relayed to the wireless network using IP address 403 and TCP port 404 described in corresponding wireless network columns. In other words, with respect to entry 407, when a packet received from the cable network is to IP address 192.168.6.113 and TCP port 1155, the IP address is converted into 10.0.100.5 and the TCP port is converted into 9833. Then, the packet is transmitted through TCP processing section 107, IP processing section 103 and wireless I/F section 101 to mobile terminal apparatus 200.

As illustrated in FIG. 7, base station apparatus 100 performs the operation for controlling TCP link over the wireless network. In FIG. 7, propagation state measuring section 504 is connected to wireless I/F section 501 (equal to the section 101), and receives an information signal on the propagation state of the wireless network. The information on the propagation state of the wireless network will be described using a received electric field strength as an example.

When it is assumed that the electric field strength value received in propagation state measuring section 504 shows transition 603 as illustrated in FIG. 8, the measurement shows a peak at time 604 and constant decreases until time 605. In addition, it is preferable that measurement time intervals be sufficiently shorter than a time interval between time 604 and time 605.

Assuming that a TCP segment receiving time interval is almost equal to the time interval between time 604 and time 605, the received electric field strength decreases during a period of from time 604 to time 605, and a TCP window size, as a TCP control parameter, at time 605 is decreased to less than a TCP window size at time 604. Further, a smaller TCP window size is set at time 606 than at time 605.

In addition, in the above description is illustrated the example of using the received electric field strength as the information on the propagation state over the wireless network. However, as the information, others such as BER (Bit Error Rate) and FER (Frame Error Rate) may be used.

An application example of this embodiment will be described with reference to FIG. 9. In FIG. 9, base station apparatuses 100 are located on a moving path of mobile terminal apparatus 200, and a wireless communication area is formed via antenna 1 connected to each base station apparatus. Route control station 705 provides I/F corresponding to a plurality of subnets each of which is connected to base station apparatus 100.

When mobile terminal apparatus 200 exists in communication area 702, mobile terminal apparatus 200 accesses to backbone network 300 through base station apparatus 100 and route control station 705. When mobile terminal apparatus 200 has moved out of communication area 702 and moves in communication area 703, in the conventional wireless access system a change in IP address is required due to the movement between subnets. In other words, as an IP address of mobile terminal apparatus 200, an IP address communicable on the subnet corresponding to communication area 703 is assigned by route control station 705 or base station apparatus 100. Using such an IP address, mobile terminal apparatus re-sets the IP address thereof again and needs to access again.

The IP address re-setting time may require a few seconds as a great value, and there are problems that when a mobile terminal apparatus moves fast in some narrow-band communication systems such as EHF access systems and DSRC (Dedicated Short Range Communication) systems having narrow communication areas, the apparatus moves out of the area while processing, or a time enabling an actual communication becomes extremely short.

In the wireless access system according to the present invention, the proxy processing of base station apparatus 100 eliminates the need of re-setting the IP address, and enables mobile terminal apparatus 200 to perform a consistent access using a predetermined fixed IP address As described above, according to this embodiment of the present invention, a base station is provided with an IP protocol relay section for performing the relay including IP processing, whereby without being aware of a subnet to which the base station belongs, the mobile terminal is capable of accessing using the static IP address, and is not forced to change the IP address at the time of moving through the subnet like as conventionally. As a result, it is possible to shorten a handover processing time.

In addition, as the configuration according to the first embodiment, the example is described where application processing section 201 and TCP processing section 202 directly have an interface. However, it may be possible to install another protocol processing section between the sections 201 and 202.

Further, while in the first embodiment the mobile terminal has the configuration provided with a wireless I/F only as an interface, it may be possible to provide the mobile terminal with cable I/F or another wireless I/F capable of newly constructing a local network to be connected to LAN. In this case, LAN is constructed with the mobile terminal as a gateway, and since the IP address of the mobile terminal does not change, none of effect due to address change is imposed on LAN.

(Second Embodiment)

The second embodiment will be described with reference to FIGS. 7 to 12.

Figure 11:
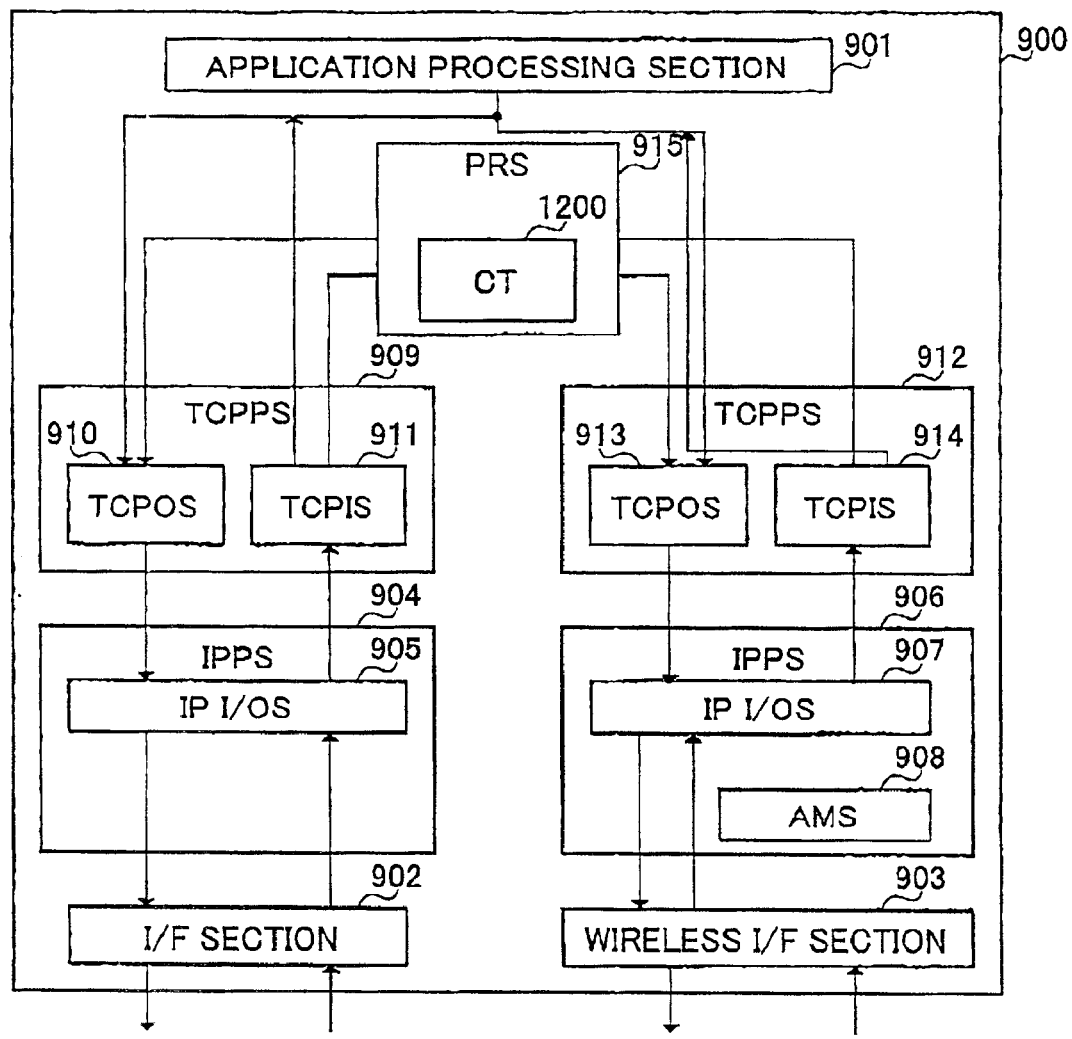
FIG. 11 is a diagram illustrating a configuration of a mobile terminal apparatus of the present invention.

FIG. 11 is a diagram illustrating a configuration of a mobile terminal apparatus of the present invention. In FIG. 11, "900" denotes a mobile terminal apparatus, "901" denotes an application section, "902" denotes an I/F section, "903" denotes a wireless I/F section, "904" denotes an IP processing section (IPPS) having IP input/output section (IPIOS) 905 connected to I/F section 902, "906" denotes an IP processing section (IPPS) having IP input/output section (IPIOS) 907 connected to wireless I/F section 903 and address managing section (AMS) 908 for processing mobile IP protocol, "909" denotes a TCP processing section (TCPPS) having TCP output section (TCPOS) 910 and TCP input section (TCPIS) 911 each connected to IP input/output section 905, "912" denotes a TCP processing section (TCPPS) having TCP output section (TCPOS) 913 and TCP input section (TCPIS) 914 each connected to IP input/output section 907, and "915" denotes a protocol relay section (PRS) which controls TCP segment relay between TCP processing sections 909 and 912 and which has conversion table (CT) 1200 associated with TCP port and IP address.

Figure 12:
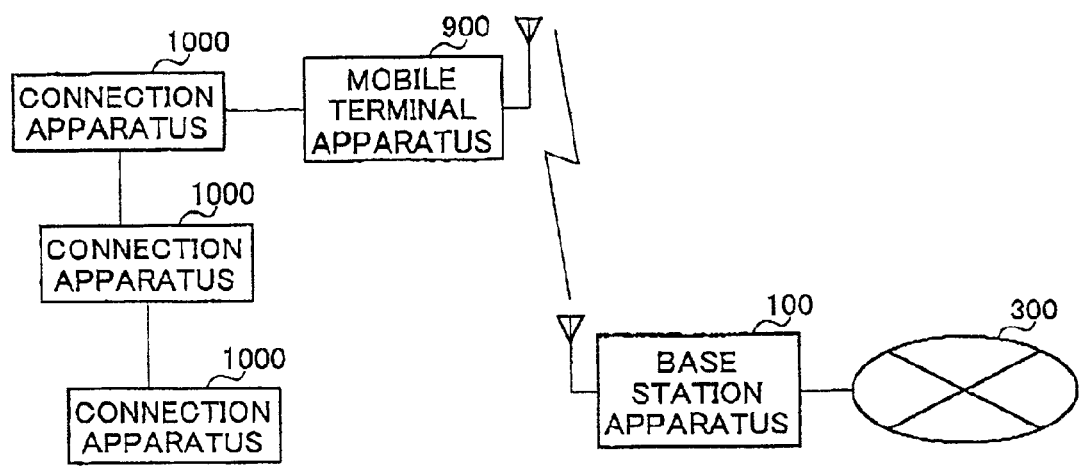
FIG. 12 is a diagram illustrating an example of a configuration of the wireless access system of the present invention.

FIG. 12 is a diagram illustrating a configuration of a wireless access system of the present invention In FIG. 12, "100" denotes the base station apparatus, "300" denotes the backbone network, "900" denotes the mobile terminal apparatus, and "1000" denotes connection apparatuses directly or indirectly connected to mobile terminal apparatus 900.

In this embodiment FIG. 7 is a diagram to explain functions with which is provided mobile terminal apparatus 900. In FIG. 7, reference numerals are the same as described in the first embodiment, while TCP processing section 503, IP processing section 502, wireless I/F section 501 are respectively equal to TCP processing section 909, IP processing section 904, and wireless I/F section 903 each illustrated in FIG. 11.

Figure 13:
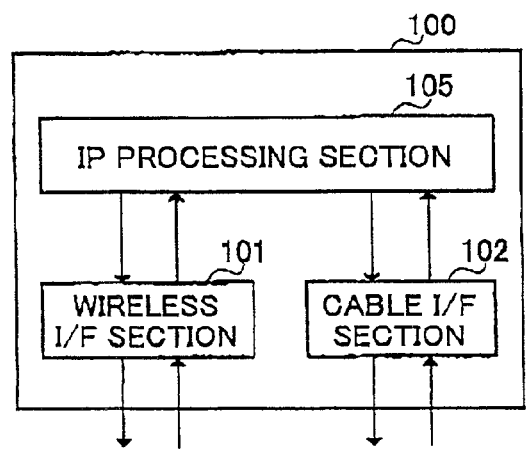
FIG. 13 is a diagram illustrating a configuration of a base station apparatus in the wireless access system of the present invention.

FIG. 13 is a diagram illustrating a configuration of the base station apparatus in the wireless access system of the present invention. In FIG. 13, "100" denotes the base station apparatus, "105" denotes the IP processing section, "101" denotes the wireless I/F section, and "102" denotes the cable I/F section.

Figure 14:
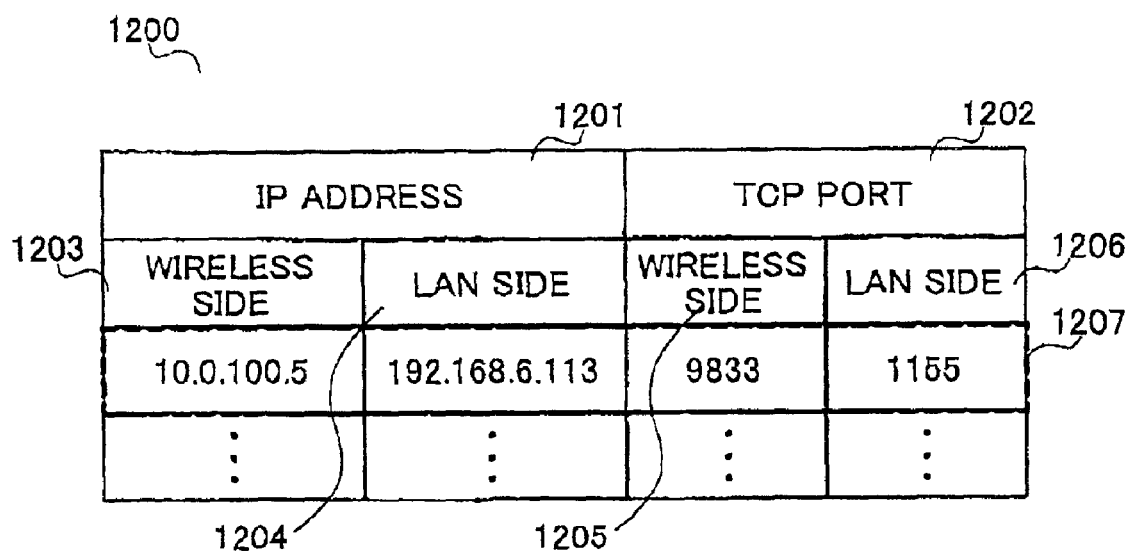
FIG. 14 is a diagram illustrating an example of a configuration of a conversion table provided in the mobile terminal apparatus of the present invention.

FIG. 14 is a diagram illustrating an example of a configuration of the conversion table provided in mobile terminal apparatus 200 of the present invention. In FIG. 14, "1200" denotes the conversion table, "1201" denotes an IP address column, "1202" denotes a TCP port column, "1203" denotes an IP address column for wireless network, "1204" denotes an IP address column for LAN, "1205" denotes a TCP port column for wireless network, "1206" denotes a TCP port column for LAN, and "1207" denotes an entry.

In addition, base station apparatus 100 in this embodiment may have the configuration described in the first embodiment, a configuration as illustrated in FIG. 13 provided with wireless I/F section 101, cable I/F section 102 and IP processing section 105, or a configuration only provided with wireless I/F section 101 and cable I/F section 102. The operation according to the above configurations will be described below.

In FIG. 11, mobile terminal apparatus 900 has wireless I/F section 903 to perform wireless communications with base station apparatus 100 and I/F section 902 to form a local network. Local network I/F section 902 may be connected to cable network media such as Ethernet or to wireless network media such as Bluetooth.

Mobile terminal apparatus 900 may have application processing section 901, and may operate alone or have at least one connection apparatus 1000 connected thereto through I/F section 902. The connection apparatus includes all apparatuses enabling IP communications such as a desktop personal computer (PC), laptop PC, cellular terminal, cellular telephone, and car navigation system.

The operation when connection apparatuses 1000 are connected to mobile terminal apparatus 900 will be described below. When either of connection apparatuses 1000 accesses to the outside, mobile terminal apparatus 900 operates as a gateway. In other words, a packet received through I/F section 902, IP processing section 904 and TCP processing section 909 is transferred to protocol relay section 915.

Protocol relay section 915 has conversion table 1200, and based on the table, performs proxy processing. An example of a basic configuration of conversion table 1200 and the proxy processing will be described with reference to FIG. 14.

In each entry are described a pair of IP addresses applied to connection apparatus 100 on a wireless network and LAN (1203 and 1204, respectively) and a pair of TCP ports applied on the wireless network and LAN (1205 and 1206, respectively). For example, with respect to entry 1207, connection apparatus 1000 with "192.168.113" as a fixed IP address on LAN is set for "10.0.100.5" on the wireless network, and using the IP address, accesses to the internet. In addition, while FIG. 14 illustrates a case of using IPv4 addresses as an IP address, using IPv6 addresses may provide the same operation without any modification in the configuration.

At the same time, connection apparatus 1000 is trying to access through TCP port "1155". In mobile terminal apparatus 900, in response to the access from connection apparatus 1000, protocol relay section 915 primarily having the TCP/IP relay function updates conversion table using "10.0.100.5" assigned as the IP address on the wireless network and "9833" assigned using an empty TCP port and then transmits the packet through TCP processing section 912, IP processing section 906 and wireless I/F section 903 each on the side of the wireless network to the wireless network. At this point, TCP processing section 912 adds TCP header 802 that is converted based on conversion table 1200, and IP processing section 906 adds header 801 that is converted similarly, to the packet, as illustrated in FIG. 10.

When there is an access from connection apparatus 1000 as to which conversion table 1200 does not have an entry, an IP address and TCP port of the wireless network are newly assigned and registered with conversion table 1200. The assignment of the IP address may be performed according to DHCP (Dynamic Host Configuration Protocol) or the stateless address autoconfiguration mechanism in IPv6 standard, and is not limited particularly. What is important is that protocol relay section 915 in mobile terminal apparatus 900 achieves as a proxy an actual communication IP address for connection apparatus 1000 to set for conversion table 1200.

Meanwhile, when a packet is received through base station apparatus 100, the received packet is transferred through wireless I/P section 903, IP processing section 906 and TCP processing section 912 to protocol relay section 915. When the packet matches in wireless network columns (1204 and 1206) an entry registered with conversion table 1200, the packet is relayed to LAN using IP address 1203 and TCP port 1204 described in corresponding LAN columns In other words, with respect to entry 1207, when a packet received from the wireless network is to IP address "10.0.100.5" and the TCP port "9833", the IP address is converted into "192.168.6.113" and the TCP port is converted into "1155". Then, the packet is transmitted through TCP processing section 909, IP processing section 904 and I/F section 902 to connection apparatus 1000.

As illustrated in FIG. 7, mobile terminal apparatus 900 has the function for controlling TCP link over the wireless network. In FIG. 7, propagation state measuring section 504 is connected to wireless I/F section 501 (equal to wireless I/F section 903 in FIG. 11), and receives an information signal on the propagation state of the wireless network.

The information on the propagation state of the wireless network will be described using a received electric field strength as an example. When it is assumed that the electric field strength value received in propagation state measuring section 504 shows transition 603 as illustrated in FIG. 8, the measurement shows a peak at time 604 and constant decreases until time 606. In addition, it is preferable that measurement time intervals be sufficiently shorter than a time interval between time 604 and time 605. Assuming that a TCP segment receiving time interval is almost equal to the time interval between time 604 and time 605, the received electric field strength decreases during a period of from time 604 to time 605, and a TCP window size, as a TCP control parameter, at time 605 is decreased to less than a TCP window size at time 604. Further, a smaller TCP window size is set at time 606 than at time 605.

In addition, in the above description is illustrated the example of using the received electric field strength as the information on the propagation state. However, as the information, others such as BER (Bit Error Rate) and FER (Frame Error Rate) may be used.

When there occurs an access from either of connection apparatuses 1000 to mobile terminal apparatus 900, a packet received through I/F section 902, IP processing section 904, and TCP processing section 909 is transferred to application processing section 901 after the IP address is to the apparatus 900, without being transferred to protocol relay section 915.

When mobile terminal apparatus 900 operates alone, in other words, when TCP processing section 909, IP processing section 904 and I/F section 902 need not to operate, protocol relay section 915 is not used, and application processing section 901 performs transmission on wireless channel using TCP processing section 912.

As described above, according to this embodiment of the present invention, in the case where a local network is constructed using a mobile terminal as a gateway in the wireless access system using an address managing scheme by, for example, Mobile IP, even when the mobile terminal changes the IP address due to the movement between subnets, the effect due to the change in the IP address is not imposed on the local network that the terminal apparatus accommodates. It is thereby possible to eliminate a time required to reflect the changed IF address or corresponding subnet address in the local network under control of the mobile terminal apparatus, and to construct a wireless access system enabling continuous communications even in handover.

In addition, while the configuration in the second embodiment illustrates an example where application processing section 901 and TCP processing sections 909 and 912 have a direct interface, it may be possible to install another protocol processing section between the above sections.

(Third Embodiment)

In the third embodiment is described an example of a base station apparatus and mobile terminal apparatus using Mobile IP. Mobile IP is such a protocol that supports user-transparent host mobility over the internet. Mobile IP supports the roaming between subnets, and enables a communication terminal apparatus to use the same IP address (home address) even when the apparatus moves.

Further, Mobile IP enables the communication terminal apparatus to continue communications while maintaining the session even when the apparatus moves. As Mobile IP, Mobile IPv4 and Mobile IPv6 have been proposed, and Mobile IPv6 will be described herein as an example.

Figure 15:
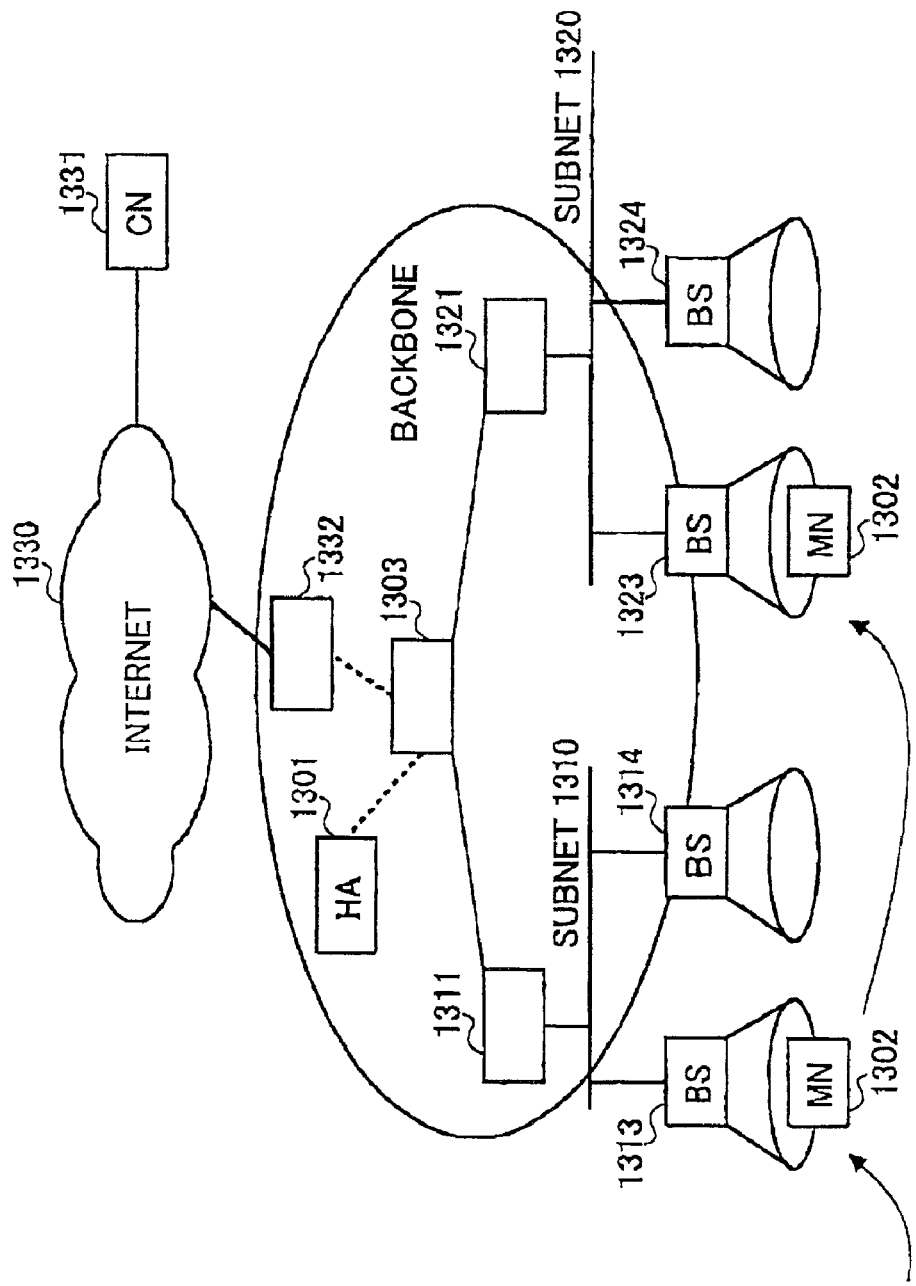
FIG. 15 is a diagram illustrating an example of Mobile IP network according to a third embodiment of the present invention.

FIG. 15 is a diagram illustrating an example of a Mobile IP network according to the third embodiment of the present invention. In FIG. 15, the Mobile IP network is comprised of HA (Home Agent) 1301, MN (Mobile Node) 1302, router 1303, router 1311 existing on subnet 1310, BS (Base Station) 1313, BS 1314, router 1321 existing on subnet 1320, BS 1323, BS 1324, internet 1330, CN 1331 and router 1332, where supposing each BS to act as a bridge(not a router). In addition, in FIG. 15 HA 1301 is connected to the network via the backbone, but may be connected via the internet.

A case will be described where MN 1302 communicates with CN 1331. MN 1302 first communicates with BS 1313 to obtain information on subnet 1310 on which MN 1302 exists from router 1311. Then, MN 1302 generates CoA (Care-of address) on subnet 1310, and using CoA as a source address, transmits a message of "Binding Update" to HA 1301.

After notifying HA 1301 of CoA, on the communications from MN 1302 to CN 1331, in the source address is described CoA, in a home address option header is described the home address, and in a destination address is described an address of CN 1331. Meanwhile, on the communication from CN 1331 to MN 1302, in the source address is described an address of CN 1331, in the destination address is described the home address, and in a routing option header is described CoA.

When MN 1302 changes from the communication with BS 1313 to that with BS 1323 on subnet 1320 due to, for example, movement, since a packet transmitted from CN 1331 is transmitted to CoA on subnet 1310 first described in the routing option header, MN 1302 is not capable of receiving the packet.

Then, when changing the subnet, MN 1302 generates CoA corresponding to the new subnet to notify HA 1301, while transmitting CoA to CN 1331. CN 1331 uses the updated CoA on packet transmission thereafter.

In the third embodiment of the present invention, the communication terminal apparatus adds an instruction for processing on the data link layer, the network layer or lower layer to a header or the like of the signal to transmit to the base station apparatus, while according to the instruction, the base station apparatus performs the processing on the data link layer, the network layer or lower layer.

Figure 16:
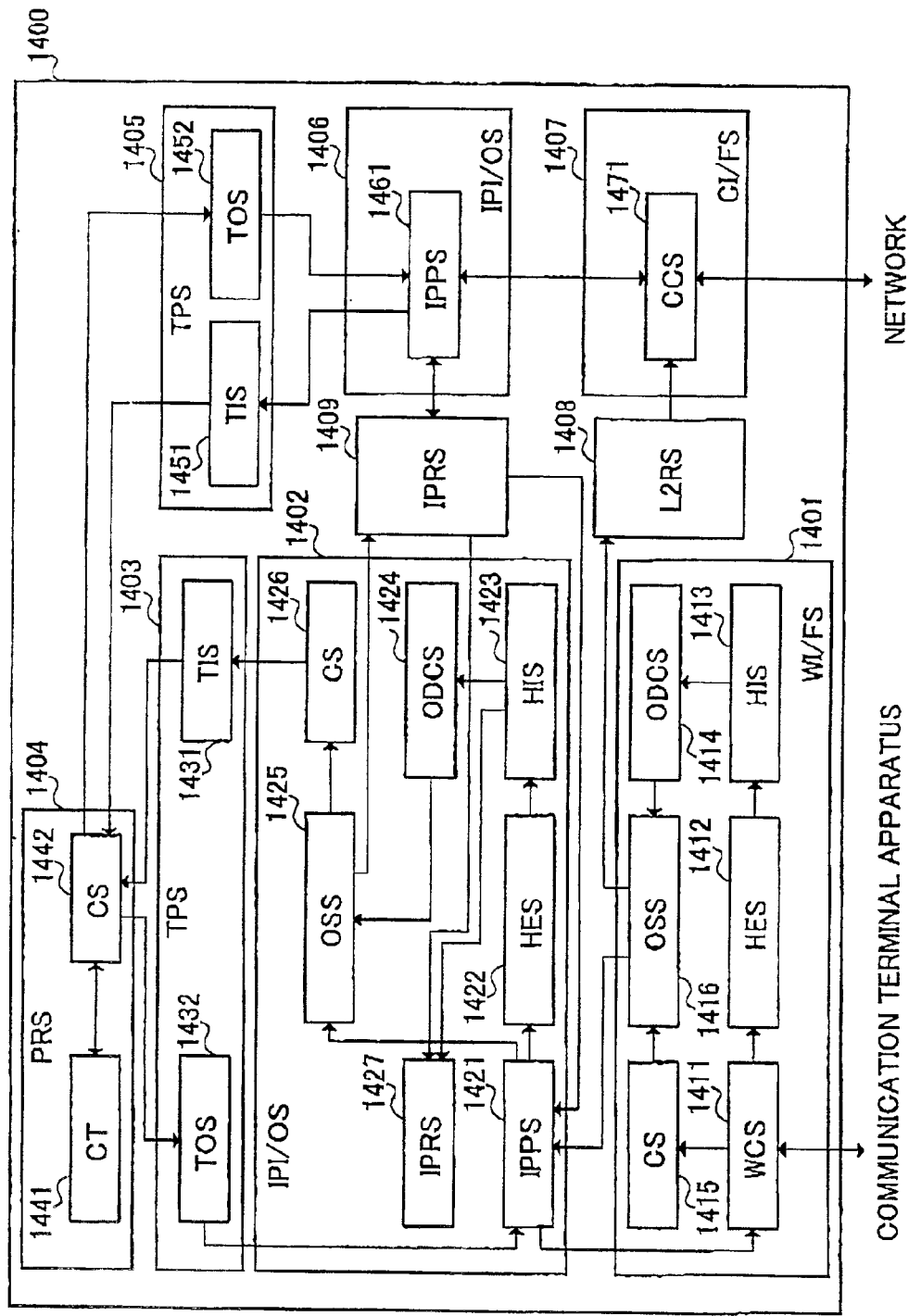
FIG. 16 is a block diagram illustrating a configuration of a base station apparatus according to the above embodiment.

FIG. 16 is a block diagram illustrating a configuration of the base station apparatus according to the third embodiment of the present invention. In FIG. 16, base station apparatus 1400 is primarily comprised of wireless I/F section (WI/FS) 1401, IP input/output section (IPI/OS) 1402, TCP processing section (TCPPS) 1403, protocol relay section (PRS) 1404, TCP processing section (TCPPS) 1405, IP input/output section (IPI/OS) 1406, cable I/F section (CI/FS) 1407, L2 relay section (L2RS) 1408 and IP relay section (IPRS) 1409.

Wireless I/F section 1401 is primarily comprised of wireless communication section (WCS) 1411, header extracting section (HES) 1412, header interpreting section (HIS) 1413, output destination control section (ODCS) 1414 composing section (CS) 1415, and output switching section (OSS) 1416. IP input/output section 1402 is primarily comprised of IP processing section (IPPS) 1421, header extracting section (HES) 1422, header interpreting section (HIS) 1423, output destination control section (ODCS) 1424, output switching section (OSS) 1425, composing section (CS) 1426 and IP registering section (IPRS) 1427.

TCP processing section 1403 is primarily composed of TCP input section (TIS) 1431 and TCP output section (TOS) 1432. Similarly, TCP processing section 1405 is primarily comprised of TCP input section (TIS) 1451 and TCP output section (TOS) 1452.

Protocol relay section 1404 is primarily comprised of conversion table (CT) 1441 and converting section (CS) 1442, IP input/output section 1406 has IP processing section (IPPS) 1461, while cable I/F section 1407 has cable communication section (CCS) 1471.

Wireless I/F section 1401 performs wireless communications with the communication terminal apparatus, while performs protocol processing on the physical layer and data link layer. The protocol processing includes radio packet header processing and physical wireless transmission processing. Wireless I/F section 1401 interprets the L2 relay field in the header of a radio packet, and when there is an instruction for performing L2 relay, transfers SDU (Service Data Unit i.e., data unit corresponding to an IP packet or ICMP packet) to cable I/F section 1407 through L2 relay section 1408. At this point, L2 relay section 1408 designates as a destination of the packet a default gateway of the network connected to cable I/F section 1407. When there is no L2 relay instruction, wireless I/F section 1401 transfers SDU to IP input/output section 1402.

Cable I/F section 1407 communicates with the cable network, and performs all the protocol processing associated with communications between adjacent nodes on the cable network. For example, cable I/F section 1407 corresponds to a media transmission protocol (such as Ethernet) processing section. The protocol processing includes header processing, division and composing of SDU and transmission processing on the physical layer and data link layer.

IP input/output sections 1402 and 1406 perform communication processing on the network layer. IP input/output section 1402 has a routing table, and based on the routing tablet determines whether to transmit a packet to either wireless I/F section 1401 or cable I/F section 1407. When the logical network is the same on the sides of cable network and wireless network, in other words, the cable network and wireless network use the same network prefix, the section 1402 uses the routing table, or is provided with another address table other than the routing table to manage particularly IP addresses of communication terminal apparatuses existing over the wireless network.

TCP processing sections 1403 and 1405 perform communication processing on the transport layer.

Protocol relay section 1404 performs the data relay between TCP processing sections 1403 and 1405. Herein, the data relay indicates the operation of receiving transmit data and associated information including at least IP information and TCP information from TCP processing 1405 for cable network, converting the IP information and TCP information into IP information and TCP information usable over the wireless network, and transferring the transmit data to TCP processing section 1403 for wireless network.

Herein, the wireless network is used in the communication between the communication terminal apparatus and base station apparatus 1400, while the cable network is used in the communication between adjacent nodes and base station apparatus 1400. Further, IP information is indicative of IP addresses of a sender and destination. TCP information is indicative of information on TCP control such as TCP ports of the sender and destination, sequence number, ACK number and so on.

The operation will be described below of each block on the physical and data link layer of OSI Reference Model in base station apparatus 1400.

Wireless communication section 1411 receives a radio signal transmitted from the communication terminal apparatus, amplifies the radio signal, converts the signal into the signal of baseband frequency, demodulates and decodes the signal, and outputs the decoded packet (received signal) to header extracting section 1412 and composing section 1415. Wireless communication section 1411 further performs coding on a packet (transmit signal) output from IP input/output section 1402 which performs the processing on the network layer, modulates the signal, converts the signal into a signal of radio frequency, amplifies the signal, and transmits the radio signal to the communication terminal apparatus.

Reader extracting-section 1412 extracts a radio packet header from the packet to output to header interpreting section 1413. Header interpreting section 1413 interprets the radio packet header, determines whether the radio packet header contains information for instructing the relay on the data link layer, and outputs the determination to output destination control section 1414.

When the determination in header interpreting section 1413 is indicative of the instruction on the relay on the data link layer, output destination control section 1414 instructs output switching section 1416 to output the packet to L2 relay section 1408. When the determination in header interpreting section 1413 is not indicative of the instruction on the relay on the data link layer, output destination control section 1414 instructs output switching section 1416 to output the packet to IP input/output section 1402.

Composing section 1415 composes divided packets transmitted from the communication terminal apparatus, and extracts L2 SDU (that corresponds to an IP packet) to output to output switching section 1416. Unit data to transfer to L2 relay section 1408 is of an IP packet, but a radio packet payload is shorter than the transferred data, and therefore composing section 1415 composes the packets.

According to the instruction of output destination control section 1414, output switching section 1416 outputs the packet to either IP input/output section 1402 or L2 relay section 1408. L2 relay section 1408 relays the packet output from output switching section 1416 to output to cable communication section 1471 of cable I/F section 1407.

Cable communication section 1471 outputs the packet output from IP input/output section 1406 or L2 relay section 1408 to the cable network, while receiving a packet output from the cable network to output to IP processing section 1461.

Figure 17:
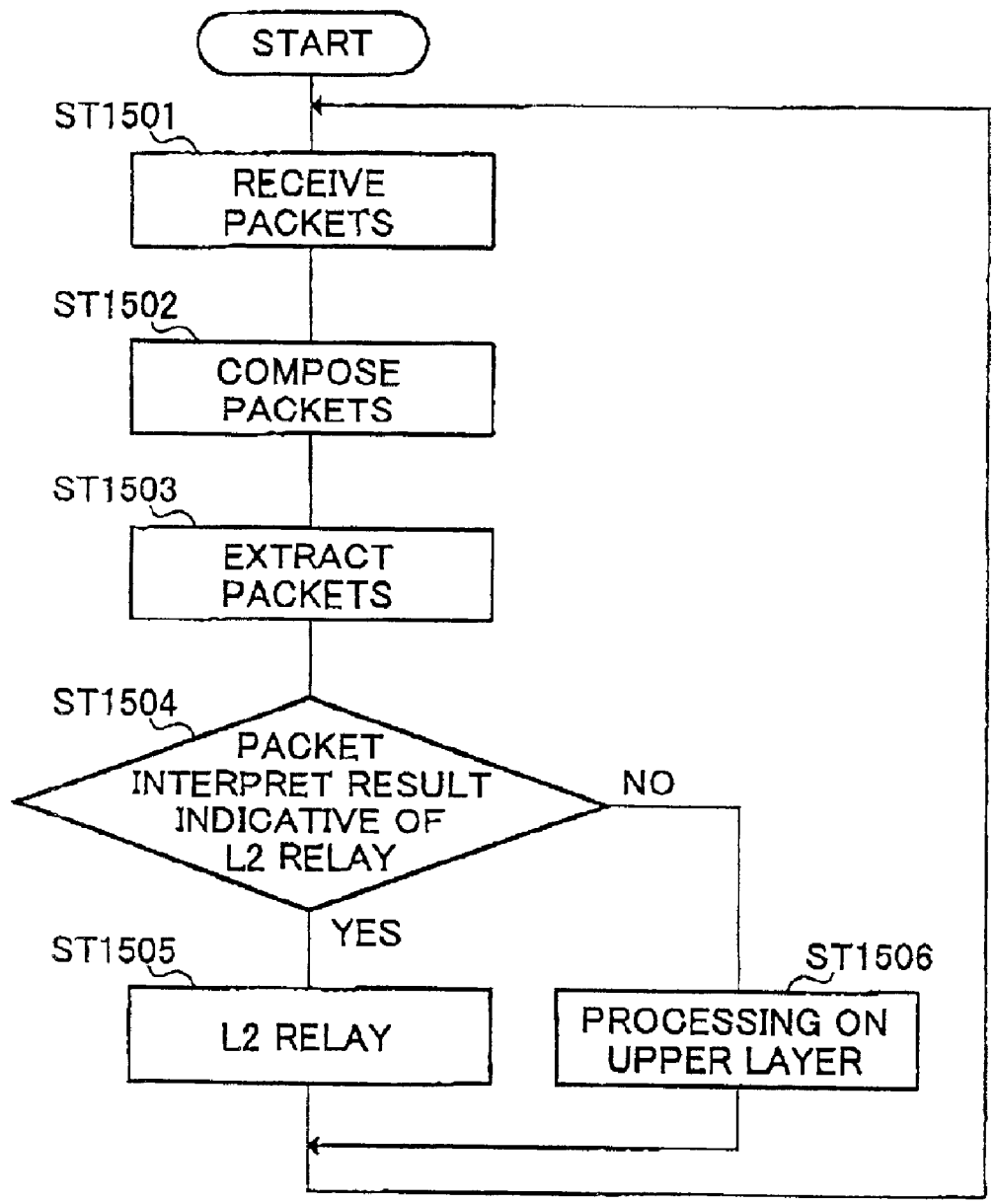
FIG. 17 is a flow diagram illustrating an example of the operation on the data link layer of OSI Reference Model in the base station apparatus according to the above embodiment.

The operation will be described below of the packet relay on the data link layer of OSI Reference Model in base station 1400. FIG. 17 is a flow diagram showing an example of the operation on the data link layer of OSI Reference Model in the base station apparatus according to this embodiment.

In FIG. 17, in ST1501 wireless communication section 1411 receives packets of radio signal transmitted from the communication terminal apparatus. In ST1502 composing section 1415 composes L2 SDU (that corresponds an IP packet) from the divided packets transmitted from the communication terminal apparatus. In ST1503 header extracting section 1412 extracts a radio packet header from the packets In ST1504 header interpreting section 1413 interprets the radio packet header and determines whether the radio packet header contains information for instructing the relay on the data link layer. When the radio packet header contains the information for instructing the relay on the data link layer, the processing flow proceeds to ST1505, while proceeding to ST1506 when the radio packet header does not contain the information for instructing the relay on the data link layer.

In ST1505 output switching section 1416 outputs L2 SDU to L2 relay section 1408, and the processing flow goes back to ST1501. In ST1506 output switching section 1416 outputs L2 SDU to IP input/output section L2 1402, and the processing flow goes back to ST1501

Figure 18:
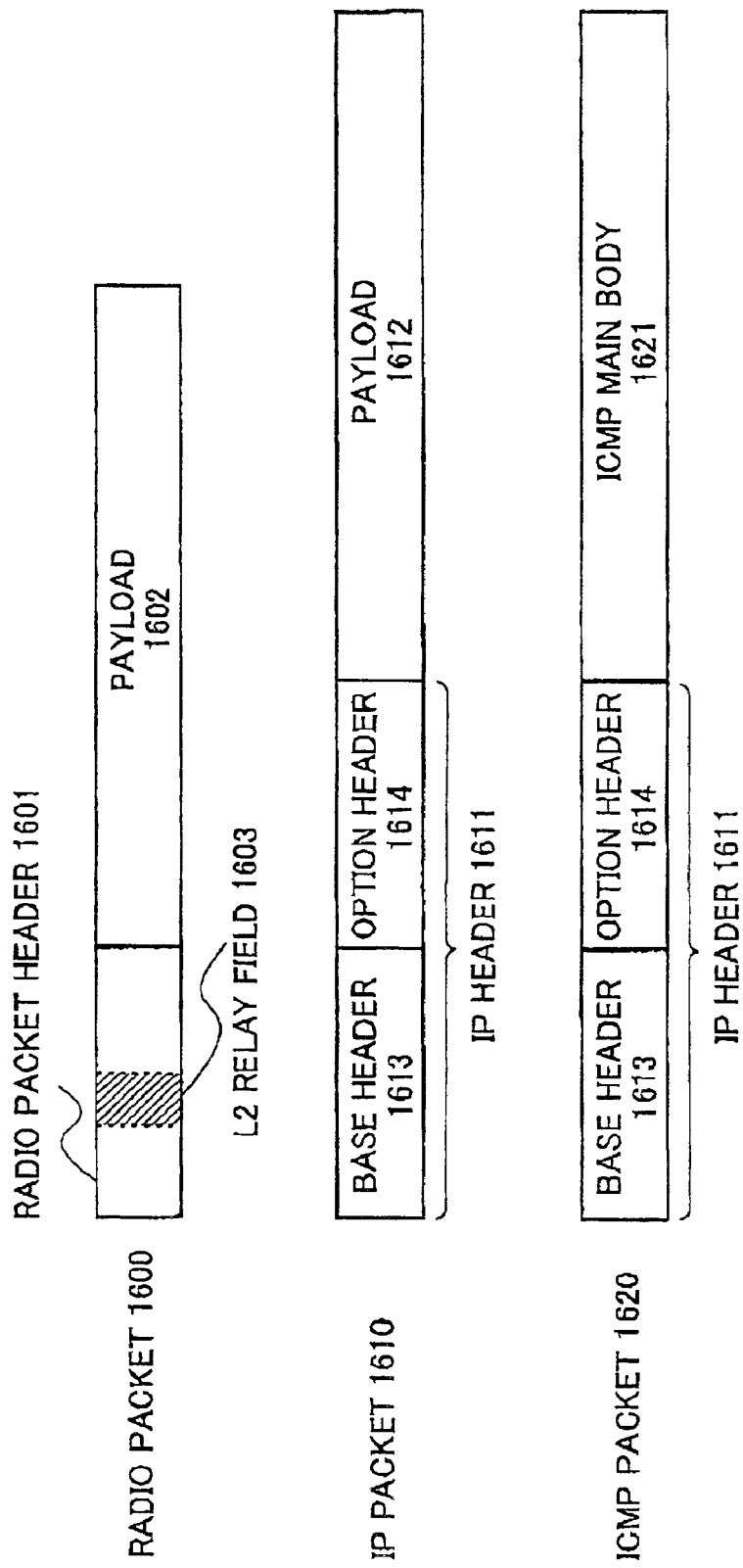
FIG. 18 is a diagram illustrating an example of a packet used in the base station apparatus according to the above embodiment.

A configuration of the radio packet header used on the data link layer will be described next. FIG. 18 is a diagram showing an example used in the base station apparatus according to this embodiment. Radio packet 1600 is a packet communicated between the base station apparatus and communication terminal, and is comprised of radio packet header 1601 and payload 1602. Radio packet header 1601 contains L2 relay field 1603 which is used when L2 relay section 1408 performs the packet relay.

IP packet 1610 is comprised of IP header 1611 and payload 1612, and IP header 1611 is comprised of base header 1613 and none or at least one option header 1614. ICMP packet 1620 is one kind of IP packet, and is comprised of IP header 1611 and ICMP main body 1621.

The base station apparatus of this embodiment refers on the data link layer to L2 relay field in the radio packet header of the radio packet to judge whether the packet is relayed on the data link layer or is provided to an upper layer to undergo the processing thereon.

Figures 19, 20:
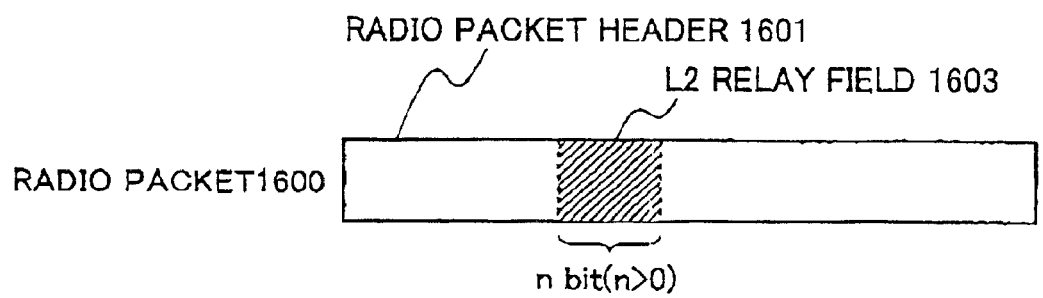
FIG. 19 is a specific diagram of a radio packet header.
FIG. 20 is a diagram illustrating an example of a priority table described in an L2 relay field of the radio packet header.

FIG. 19 is a specific diagram of radio packet header 1601. L2 relay field 1603 has a field width of at least one bit, and in the field 1603 are described priorities corresponding to the type of transmit packet. FIG. 20 is a diagram illustrating an example of a priority table described in L2 relay field 1603 of radio packet header 1601. In FIG. 20, the type of packet and content to be described in L2 relay field 1603 are associated with each other. In FIG. 20, Binding Update has a higher priority, while ICMP (associated with MIP(Mobile IP)) has a low priority.

The operation will be described next on the network layer of OSI Reference Model in base station apparatus 1400.

IP processing section 1421 performs the header processing on the IP packet or ICMP packet communicated over the wireless network, and outputs the packet output from output switching section 1416 of wireless I/F section 1401 to header extracting section 1412 and output switching section 1425, IP processing section 1421 performs the header processing on the packet output from TCP processing section 1403 to output to wireless communication section 1411 of wireless I/F section 1401. For example, IP processing section 1421 is provided with an address table. Then, when a destination address is contained in the address table, in other words, when the destination address matches with an IP address of a mobile terminal existing over the wireless network, IP processing section 1421 transfers the packet to wireless I/F section 1401.

Header extracting section 1422 extracts the IP header from the packet to output to header interpreting section 1423. Header interpreting section 1423 interprets the IP header, and determines whether the payload of the IP packet is of TCP, and outputs the determination to output destination control section 1424. Header interpreting section further determines whether to need to register an IP address while interpreting the IP header, and outputs another determination to IP registering section 1427.

When the determination in header interpreting section 1423 is indicative of that the payload of the IP packet is not of TCP, output destination control section 1424 instructs output switching section 1425 to output the packet to IP relay section 1409. Meanwhile, when the determination in header interpreting section 1423 is indicative of that the payload of the IP packet is of TCP, output destination control section 1424 instructs output switching section 1425 to output the packet to composing section 1426.

According to the instruction of output destination control section 1424, output switching section 1425 outputs the packet to either composing section 1426 or IP relay section 1409. IP relay section 1409 relays the packet output from output switching section 1425 to output to IP processing section 1461 of IP input/output section 1406. Composing section 1426 composes the packets to output to TCP processing section 1303.

IP processing section 1461 outputs the packet output from TCP processing section 1405 or IP relay section 1409 to cable network communication 1471 of cable I/F section 1407, while receiving the packet output from cable I/F section 1407 to output to TCP processing section 1405.

According to the another determination in header interpreting section 1423, when the source address is a new IP address, IP registering section 1427 registers the IP address. For example, when an IP address that is not registered with the address table is detected in the source address field, IP registering section 1427 registers the IP address with the address table.

Figure 21:
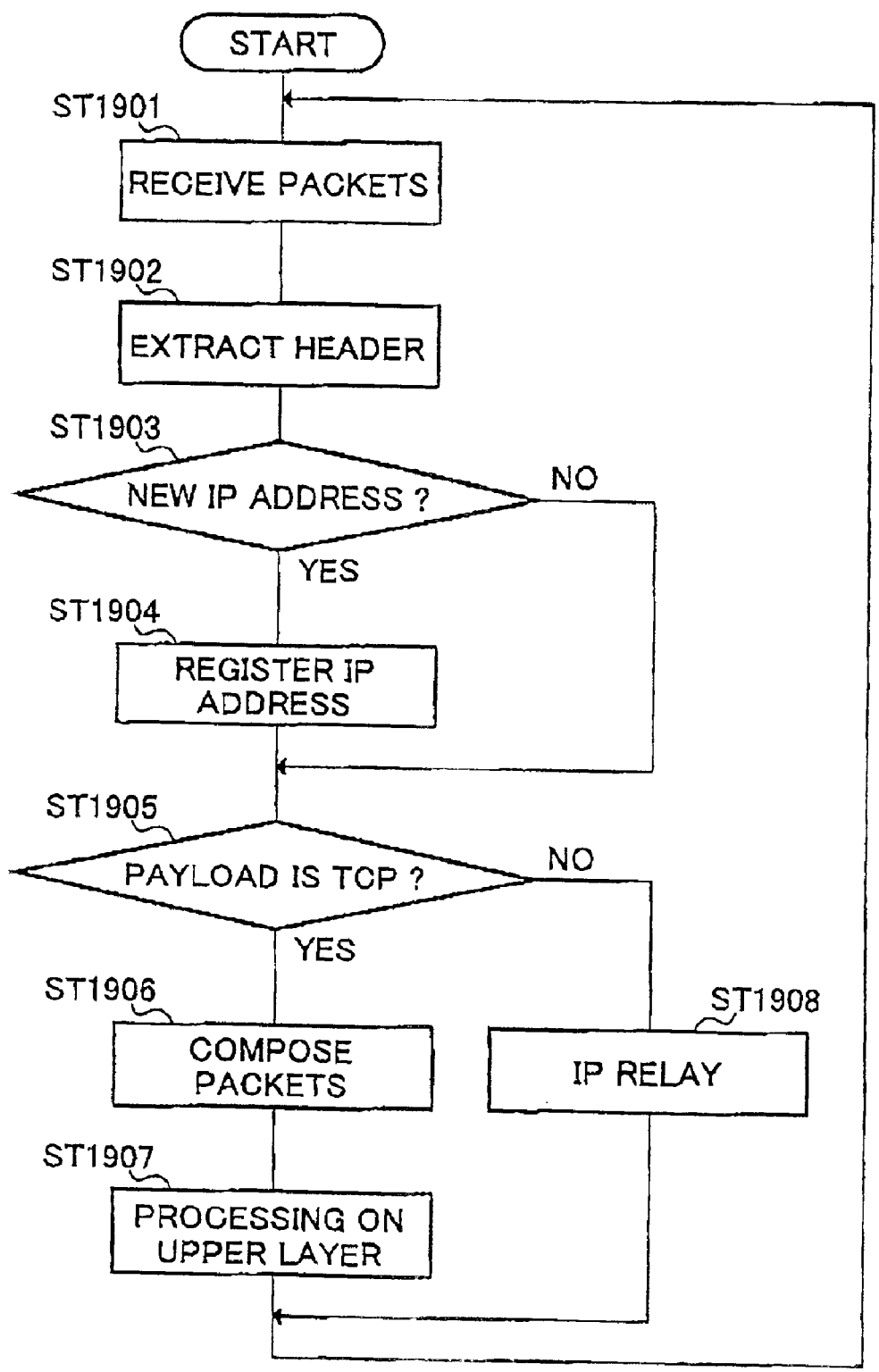
FIG. 21 is a flow diagram illustrating an example of the operation on the network layer of OSI Reference Model in the base station apparatus according to the above embodiment.

The operation of the packet relay will be described next on the network layer of OSI Reference Model in base station apparatus 1400. FIG. 21 is a flow diagram illustrating an example of the operation on the network layer of OSI Reference Model in the base station apparatus of this embodiment.

In FIG. 21, in ST1902 IP processing section 1421 obtains a packet to process from wireless I/F section 1401. In ST1902 header extracting section 1422 extracts an IP header from the packet.

In ST1903 header interpreting section 1423 interprets the IP header, and determines whether or not the source address of the packet is a new IP address that is not registered with IP registering section 1427. When the source address of the packet is the new Is address, the processing flow proceeds to ST1904, while proceeding to ST1905 when the source address of the packet is not the new IP address. In ST1904 IP registering section 1427 registers the new IP address.

In ST1905 header interpreting section 1423 interprets the IP header, and determines whether or not the payload is of TCP. When the payload is of TCP, the processing flow proceeds to ST1906, while proceeding to ST1908 when the payload is not of TCP.

In ST1906 composing section 1426 composes packets. In ST1907 composing section 1426 outputs the packets to TCP processing section 1403, and the processing flow goes back to ST1901.

In ST1908 the packet is output from output switching section 1425 to IP processing section 1461 through IP relay section 1409, and the processing flow goes back to ST1901.

Figure 22:
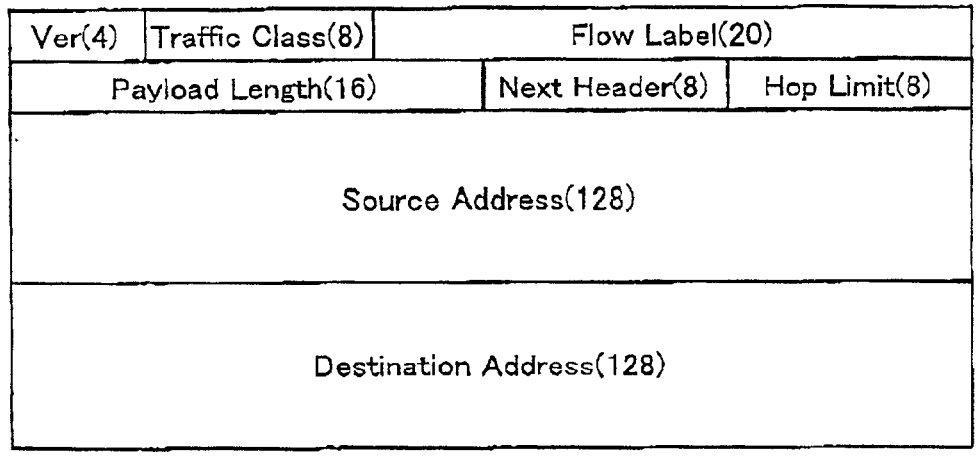
FIG. 22 is a diagram illustrating a configuration of an IP base header.
Figure 23:
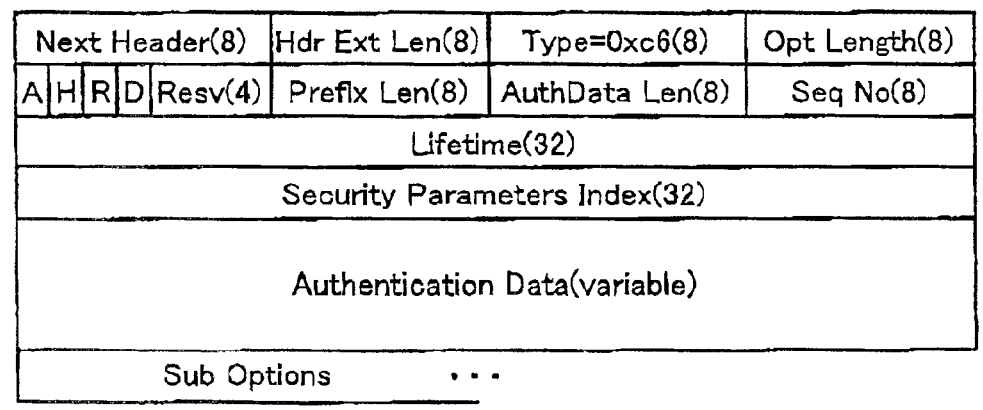
FIG. 23 is a diagram illustrating an example of a configuration of an IP option header.

The packet used on the network layer will be described next. FIG. 22 is a diagram showing a configuration of IP base header 1613 conforming to RFC2460. FIG. 23 is a diagram showing an example of a configuration of IP option header 1614, and specifically showing a configuration of Binding Update Option used in Mobile IP as a destination option header.

Figure 24:
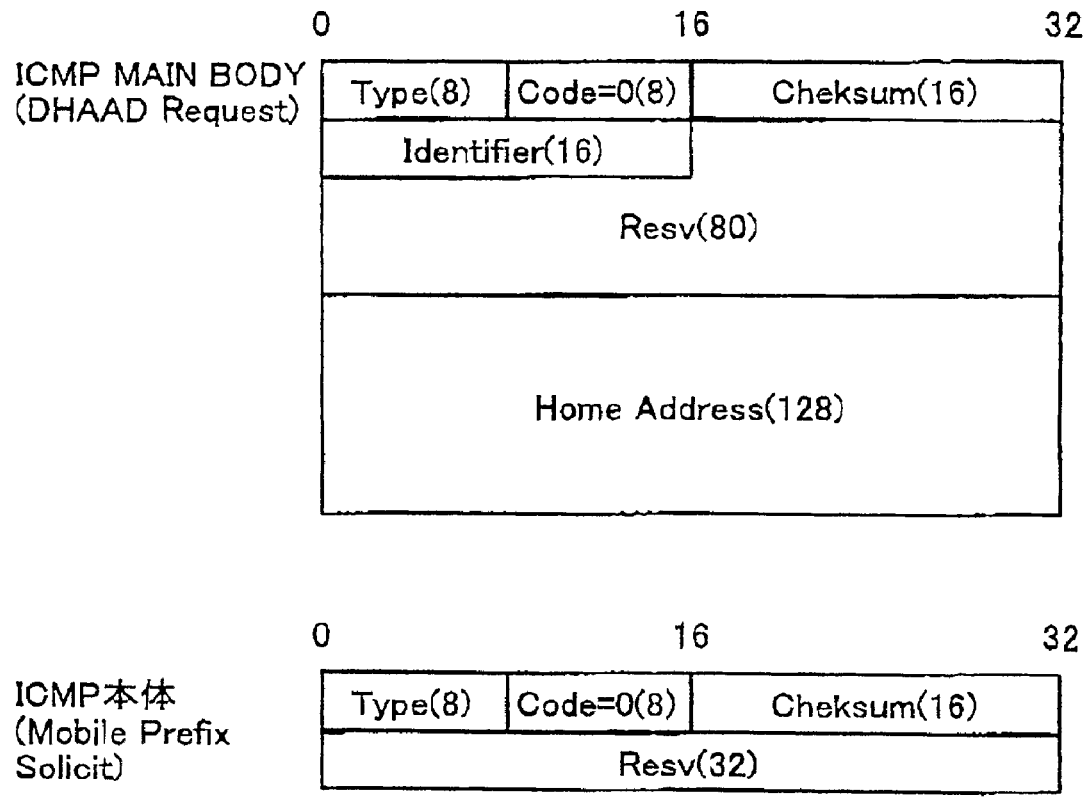
FIG. 24 is a diagram illustrating an example of a configuration of an ICMP main body.

FIG. 24 is a diagram showing an example of a configuration of ICMP main body 1621, and specifically showing configurations of Dynamic Agent Address Discovery (hereinafter referred to as DHAAD) request message and of Mobile Prefix Solicitation (hereinafter referred to as MPS) message.

The operation will be described next on the transport layer or upper layer of OSI Reference Model in base station apparatus 1400

TCP input section 1431 performs the protocol processing of the transport layer on the packet output from output switching section 1425 in the IP input/output section to output to converting section 1442 in protocol relay section 1404. At the same time, TCP input section 1451 performs the protocol processing of the transport layer on the packet output from IP processing section 1461 in IP input/output section 1406 to output to converting section 1442 in protocol relay section 1404.

Conversion table 1441 stores a combination of IP address and port number of cable network associated with a combination of IP address and port number of wireless network Converting section 1442 refers to conversion table 1441 to convert the IP address and port number of the packet output from TCP input section 1431, and outputs the packet to TCP output section 1452 in TCP processing section 1405.

Similarly, converting section 1442 refers to conversion table 1441 to convert the IP address and port number of the packet output from TCP input section 1451, and outputs the packet to TCP output section 1432 in TCP processing section 1403.

TCP output Section 1432 performs the protocol processing of the transport layer on the packet output from converting section 1442 to output to IP processing section 1421 in IP input/output section 1402. Similarly, TCP output section 1452 performs the protocol processing of the transport layer on the packet output from converting section 1442 to output to IP processing section 1461 in IP input/output section 1406.

Figure 25:
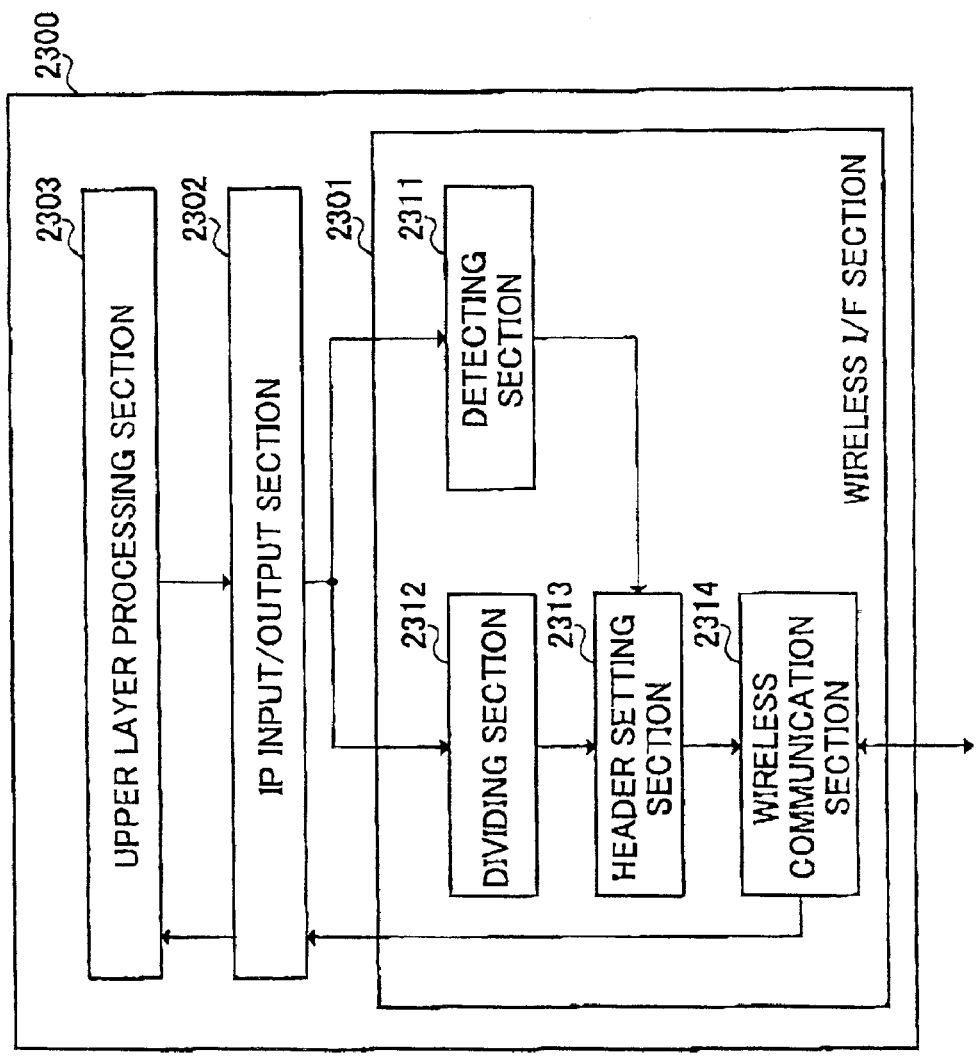
FIG. 25 is a block diagram illustrating an example of a configuration of a communication terminal apparatus according to the above embodiment.

The communication terminal apparatus will be described below which performs wireless communications with base station apparatus 1400. FIG. 25 is a block diagram illustrating an example of a configuration of the communication terminal apparatus according to this embodiment.

Communication terminal apparatus 2300 in FIG. 25 is primarily comprised of wireless I/F section 2301, IP input/output section 2302 and upper layer processing section 2303. Wireless I/F section 2301 is primarily comprised of detecting section 2311, dividing section 2312, header setting section 2313 and wireless communication section 2314.

In FIG. 25, wireless I/F section 2301 performs all the protocol processing relating to the wireless communications with the base station apparatus, and provides and receives packets to/from IP input/output section 2302. Herein, the protocol processing includes the radio packet header processing and physical wireless processing.

IP input/output section 2302 provides and receives packets to/from wireless I/F section 2301 and upper layer processing section 2303, and performs the header processing of IP packets communicated over the wireless network and the processing relating to Mobile IP.

Upper layer processing section 2303 performs the protocol processing of OSI layer 4 and/or upper layers, which includes, for example, the protocol processing of application processing OSI layer 4 and upper layers.

Detecting section 2311 detects whether the IP packet output from IP input/output section 2302 is a control packet relating to Mobile IP, and outputs the detected result to header setting section 2313.

Dividing section 2312 divides the IP packet into radio packets to output to header setting section 2313.

When the detected result output from detecting section 2311 is indicative of the control packet relating to Mobile IP, header setting section 2313 adds an instruction on the relay on the data link layer to an L2 relay field of the radio packet header of the packet divided in dividing section 2312 to output to wireless communication section 2314. The control packet includes the IP packet containing Binding Update destination option header and ICMP packets to issue to inquire HA address or the like.

In addition, it is not always necessary for detecting section 2311 to operate independently, and it may be possible that IP input/output section 2302 or wireless I/F section 2301 performs the corresponding operation.

When moving between different networks of subnet, communication terminal apparatus 2300 changes the IP address used in the communication. For example, in FIG. 15, when MN 1302 moves from a network of subnet 1310 to a network of subnet 1320, MN 1302 that corresponds to communication terminal 2300 changes the IP address.

At this point, according to the operation prescribed in Mobile IP, MN 1302 transmits a Binding Update message to HA 1301. The Binding Update message is achieved by the IP packet containing Binding Update option defined as a destination option header.

When receiving the Binding Update message, HA 1301 updates Binding Cache corresponding to a position database of MN1302. HA1301 refers to the updated Binding Cache to normally transfer the IP packet for MN 1302 transmitted from the outside.

Further, MN 1302 transmits the Binding Update message to CN 1331 which has communicated until the IP address is changed Similarly to HA 13017 CN 1331 updates Binding Cache, and refers to the updated Binding Cache to transmit the packet for MN 1302.

As described above, Binding Update issued at the time of changing an IP address needs to be transferred promptly to a communication partner station and home agent to update Binding Cache. The operation of communication terminal apparatus 2300 will be described below.

When communication terminal apparatus 2300 transmits the Biding Update message and the associated ICMP packet, detecting section 2311 detects the Binding Update message, DHAAD, MPS message or other Mobile IP control messages from the IP packet to transmit.

Detecting section 2311 refers to a value indicative of the Binding Update message in the option header of the IP packet transferred from IP input/output section 2302 to detect. For example, detecting section 2311 determines whether a Type field that is one of option headers of the IP packet contains a destination header with a value of 0xc6. The value of 0xc6 in the Type field is one of examples for indicating the Binding Update message, and the value is not limited particularly as long as the value is of Type field value for indicating the Binding Update message.

When the detected result in detecting section 2311 is indicative of the Binding Update message, header setting section 2313 sets a value indicative of performing L2 relay for the L2 relay field.

Further, a case may occur of transmitting the DHAAD request message and MPS message prior to Binding Update to acquire the HA address and Home Prefix. The DHAAD request message and MPS message are both achieved by the ICMP packet. As illustrated in FIG. 24, ICMP main body contains the DHAAD request message or MPS message.

In this case, detecting section 2311 determines whether the Type field of the transferred transmit ICMP packet has a value indicative of DHAAD request message or MPS message. When the Type field has the value indicative of the DHAAD request message or MPS message, header setting section 2313 sets the value indicative of performing L2 relay for the L2 relay field.

Thus, according to the base station apparatus and communication terminal apparatus of this embodiment, the communication terminal apparatus adds an instruction for relaying a packet on the data link layer to a header of the packet to transmit, while the base station apparatus interprets the header of the packet, and relays the packet on the data link layer, whereby the need is eliminated of performing processing on or above the transport layer, and it is thereby possible to totally reduce the overhead and to shorten a packet transmit time.

Specifically, according to the base station apparatus of this embodiment of the present invention, by being provided with the L2 relay section that performs the relay processing between the wireless I/F section and cable I/F section, the control packet such as Binding Update in Mobile IP undergoes the bridge transfer on the layer 2 between the sides of wireless network and cable network without being processed in the IP processing section, thereby decreasing the transfer time. Further, the mobile terminal determines whether or not to need the L2 relay and instructs the L2 relay section by using the radio packet header, whereby it is possible to reduce a processing load on the base station that performs a lot of packet processing.

Figure 26:
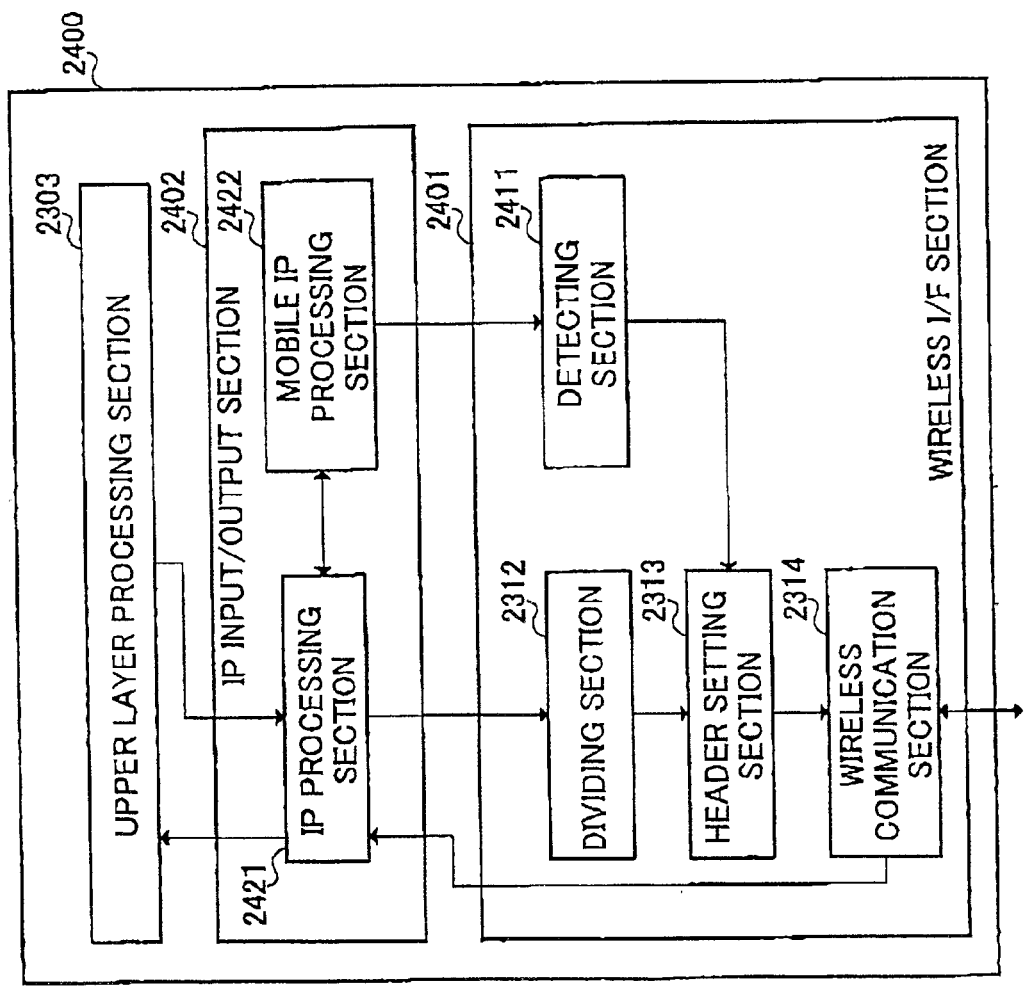
FIG. 26 is a block diagram illustrating another example of a configuration of a communication terminal apparatus according to the above embodiment.

In addition, the communication terminal apparatus of this embodiment is capable of instructing the setting of a header directly in the processing of Mobile IP. FIG. 26 is a block diagram illustrating an example of a configuration of the mobile terminal apparatus according to this embodiment.

The communication terminal apparatus in FIG. 26 differs from that in FIG. 25 in points that wireless I/F section 2401 is provided with detecting section 2411, IP input/output section 2402 is provided with IP processing section 2421 and Mobile IP processing section 2424, and the setting of the header is instructed directly in the processing of Mobile IP.

In FIG. 26, IP processing section 2421 performs the processing relating to IF on a packet output from upper layer processing section 2303 to output to dividing section 2312. Further, IP processing section 2421 performs the processing relating to IP on a packet output from wireless communication section 2314 to output to upper layer processing section 2303.

Mobile IF processing section 2422 instructs detecting section 2411 on the relay of the packet on the data link layer when the packet to transmit is capable of being relayed on the data link layer in the base station apparatus of the communication partner, for example, by generating Binding Update message in the processing relating to Mobile IP.

According to the instruction from Mobile IP processing section 2422, detecting section 2411 outputs the instruction for setting of the contents of the relay on the data link layer for a header to header setting section 2313.

Thus, in the communication terminal apparatus of this embodiment, the instruction on the relay on the data link layer in the base station apparatus is output by using the contents of the processing of Mobile IP, and a header of a packet to transmit is set for the instruction on the relay, whereby it is not necessary to interpret the contents of the packet to set the header, and therefore it is possible to transmit packets promptly.

Further, the contents of the L2 relay field as described above are not limited particularly, as long as the contents include the instruction on the relay on the data link layer in the base station apparatus. An example of the set value in the L2 relay field will be described below The L2 relay field is capable of storing a value of at least one bit.

When the value is represented by 1 bit, as the information to store, there are two types, i.e., performing or not performing the relay. In this case, the value is set so that the L2 relay is performed on the previously described Binding Update message, DHAAD request message, MPS message and other Mobile IP control message, while being not performed on the others.

When the value is represented by 2 or more bits, it is possible to increase the information to store, and to prescribe the priority when the L2 relay is performed, For example, as illustrated in FIG. 20, the priorities are set that the L2 relay is performed with a higher priority on Binding Update which is issued the most number of times and which needs to be transferred more promptly, while being performed with a lower priority on associated ICMP packet which is issued the relatively small number of times, whereby when requests from a plurality of mobile terminals are congested, it is possible to transfer important control packets promptly.

In addition, it may be possible to apply an L2 relay field to a packet not relating to Mobile IP, and the present invention is not limited in its use.

Further, it may be possible for Base Station 1400 to relay IP packets between the wireless link and the cable link without IP register section 1427, where subnets assigned on the wireless I/F and the cable I/F are different, in other word, the Base Station 1400 performes entirely IP router.

The base station apparatus of this embodiment is applicable to both cases that the same network is used over a cable network and a wireless and that different subnets are used respectively over a cable network and wireless network. Further, the base station apparatus does not need to be always provided with IP registering section 1427.

(Fourth Embodiment)

Figure 27:
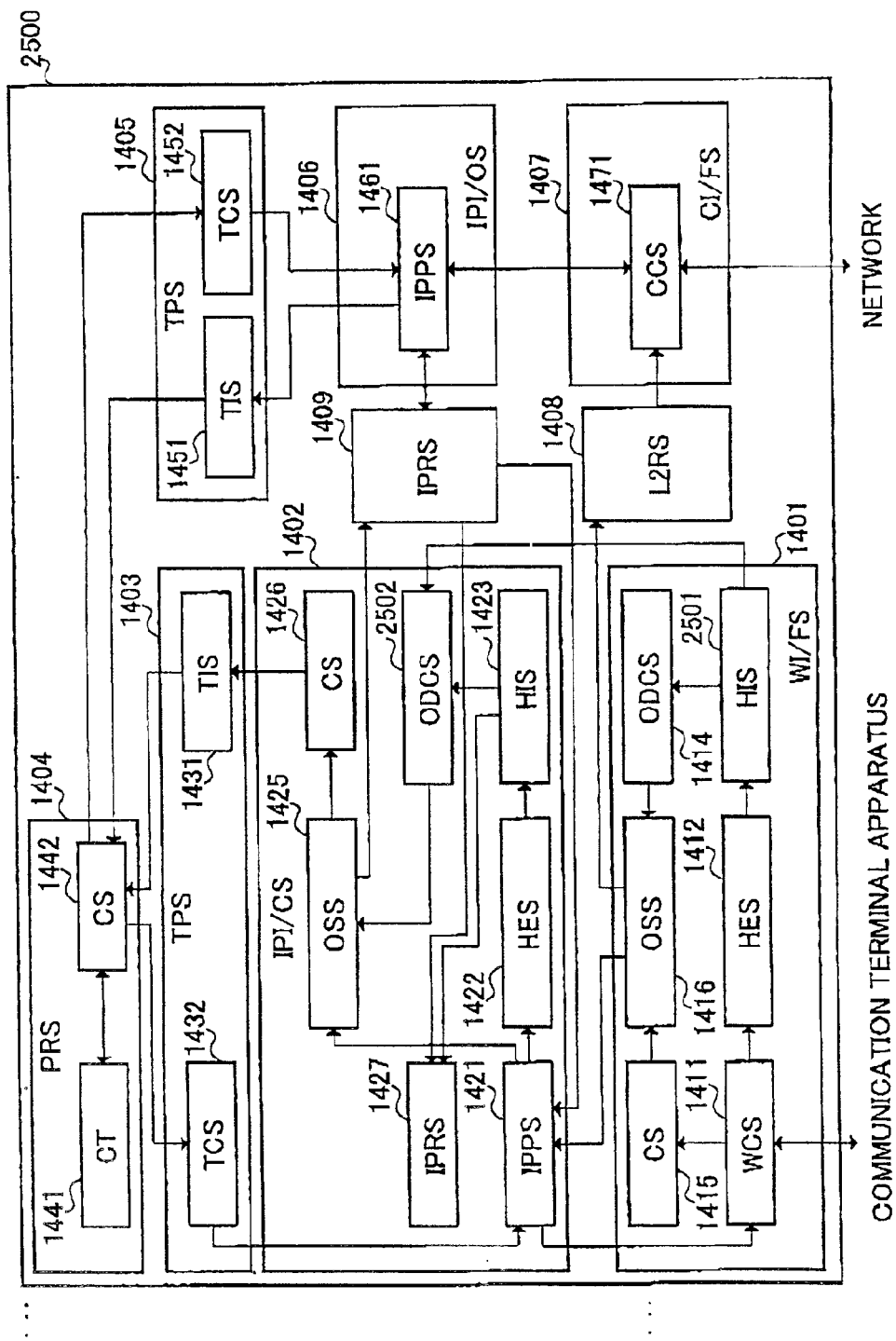
FIG. 27 is a block diagram illustrating a configuration of a base station apparatus according to a fourth embodiment of the present invention.

FIG. 27 is a block diagram illustrating a configuration of a base station apparatus according the fourth embodiment of the present invention. In addition, the same sections as in FIG. 16 are assigned the same reference numerals as in FIG. 16 to omit specific explanations.

Base station apparatus 2500 in FIG. 27 is provided with header interpreting section (HIS) 2501 and output destination control section (ODCS) 2502 where an instruction on the relay on or above the network layer is extracted from a header of a packet, and according to the instruction, the packet undergoes the relay processing on or above the network layer, and in this respect, differs from base station apparatus 1400 in FIG. 16.

Header extracting section 1412 extracts a radio packet header from the packet to output to header interpreting section 2501.

Header interpreting section 2501 interprets the radio packet header, determines whether the radio packet header contains information for instructing the relay on the data link layer, and outputs the determination to output destination control section 1414. Further, header interpreting section 2501 whether an upper transfer field of the radio packet header contains the instruction for transferring SDU to TCP processing section 1403 on the upper layer, and outputs the determination to output destination control section 2502.

When the determination in header interpreting section 2501 is indicative of the instruction for relaying on the data link layer, output destination control section 1414 instructs output switching section 1416 to output the packet to L2 relay section 1408. When the determination in header interpreting section 2501 is not indicative of the instruction for relaying on the data link layer, output destination control section 1414 instructs output switching section 1416 to output the packet to IP input/output section 1402.

Header interpreting section 1423 interprets the IP header, determines whether the payload of the IP packet is of TCP, and outputs the determination to output destination control section 2502.

When the determination in header interpreting section 2501 contains an instruction for relaying SDU to TCP processing section 1403, output destination control section 2502 instructs output switching section 1425 to output the packet to composing section 1426.

When the determination in header interpreting section 1423 is indicative of that the payload of the IP packet is not of TCP, output destination control section 2502 instructs output switching section 1425 to output the packet to IP relay section 1409. Meanwhile, when the determination in header interpreting section 1423 is indicative of that the payload of the IP packet is of TCP, output destination control section 2505 instructs output switching section 1425 to output the packet to composing section 1426.

According to the instruction of output destination control section 2505, output switching section 1425 outputs the packet to either composing section 1426 or IP relay section 1409. IP relay section 1409 relays the packet output from output switching section 1425 to output to IP processing section 1461 of IP input/output section 1406

Figure 28:
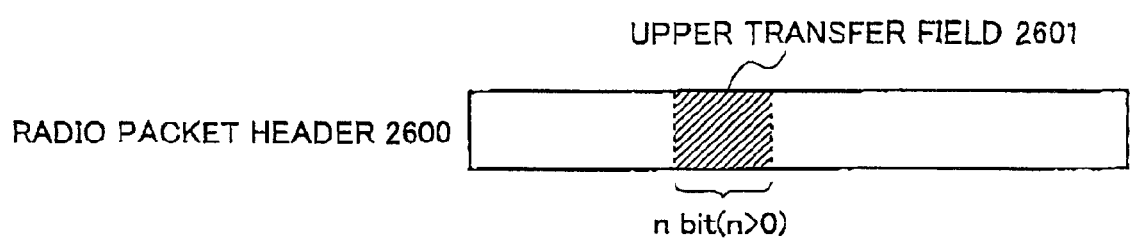
FIG. 28 is a diagram illustrating a radio packet header of a radio packet used in a wireless communication method according to the above embodiment.

FIG. 28 is a diagram showing a radio packet header of a radio packet used in the wireless communication method according to the fourth embodiment of the present invention. Radio packet header 2600 illustrated in FIG. 28 is provided with upper transfer field 2601. Base station apparatus 2500 refers to the contents of upper transfer field 2601 to determine a layer for use in the relay.

Thus, according to the base station apparatus of this embodiment, the apparatus refers to a header of a packet transmitted from the communication terminal apparatus, extracts information for instructing a layer on which the relay processing is performed, and according to the instruction, determines the layer on which the packet is relayed, whereby it is not necessary to determine whether or not to relay while referring to the header of the packet for each layer, and it is thereby possible to reduce a load of packet relay processing.

Specifically, according to this embodiment of the present invention, the mobile terminal performs payload determination processing, which is conventionally performed by a base station apparatus, at the time of transmitting a packet, and notifies the result to a base-station IP processing via a radio packet header, whereby it is possible to reduce a processing load on the base station which should perform a lot of packet processing. This embodiment provides great effectiveness particularly in a communication system applying IPv6 enabling many option headers to be added.

In addition, FIG. 28 illustrates an example where the upper transfer field has a value of one or more bits. However, in the case of representing only as to whether or not to perform the relay, reserving the value of at least one bit may be adequate.

Further, in base station apparatus 2500 the payload information may be acquired directly from header interpreting section 1423. However, the operation as described in this embodiment enables the reduction of processing time.

Further, it may be possible for Base Station 2500 to relay IP packets between the wireless link and the cable link without IP register section 1427, where subnets assigned on the wireless I/F and the cable I/F are different, in other word, the Base Station 2500 performes entirely IP router.

The base station apparatus of this embodiment is applicable to both cases that the same network is used over a cable network and a wireless and that different subnets are used respectively over a cable network and wireless network. Further, the base station apparatus does not need to be always provided with IP registering section 1427.

(Fifth Embodiment)

Figure 29:
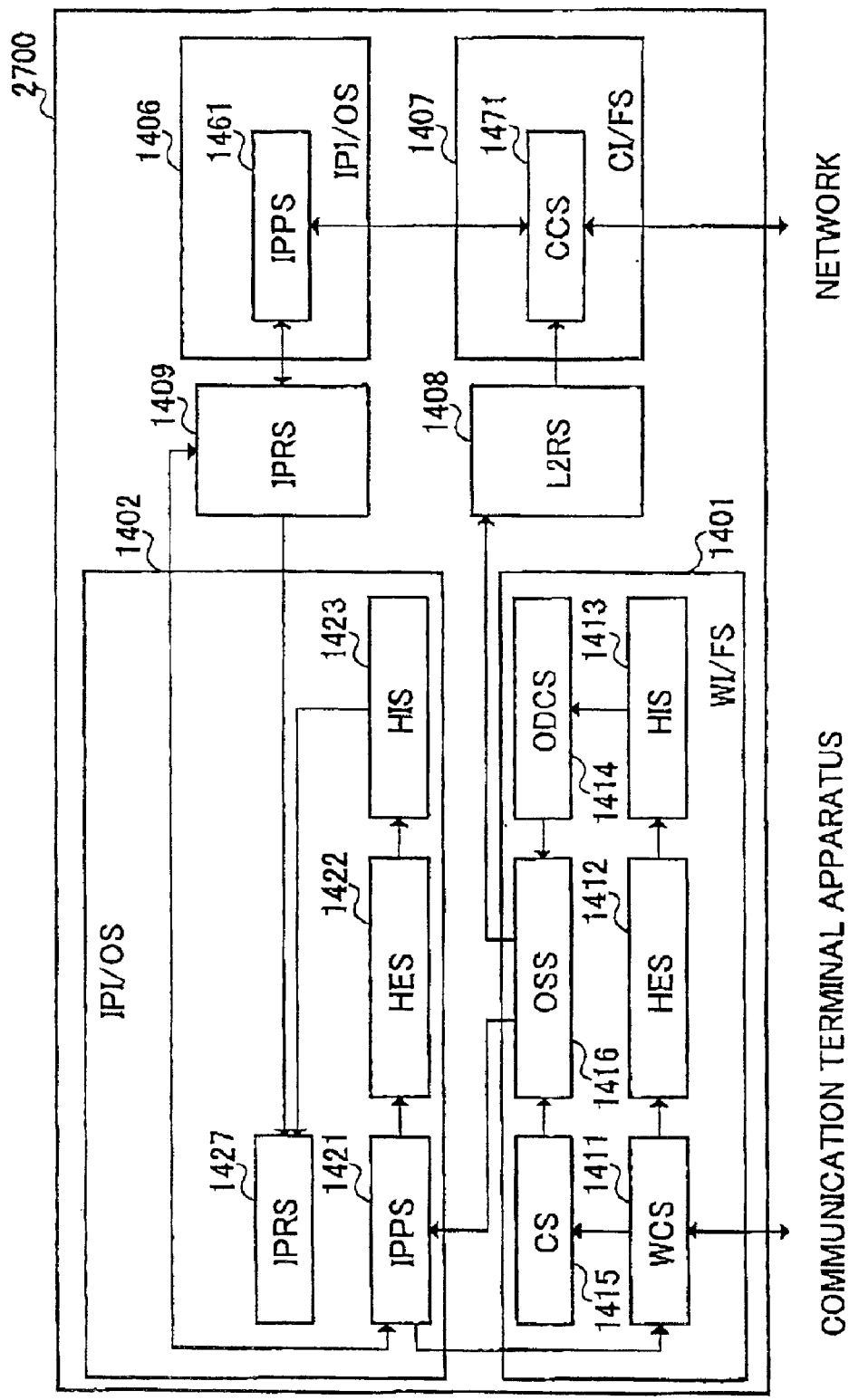
FIG. 29 is a block diagram illustrating a configuration of a base station apparatus according to a fifth embodiment of the present invention.

FIG. 29 is a block diagram illustrating a configuration of a base station apparatus according to the fifth embodiment of the present invention. Base station apparatus 2700 in FIG. 29 is primarily comprised of wireless I/F section 1401, IP input/output section 1402, IP input/output section 1406, cable I/F section 1407, L2 relay section 1408 and IP relay section 1409, while functioning as a so-called router for relaying packets of a communication partner without performing processing on and above layer 4, and in this respect, differs from the base station apparatus in FIG. 16.

Wireless I/F section 1401 is primarily comprised of wireless communication section 1411, header extracting section 1412, header interpreting section 1413, composing section 1415, output destination control section 1414 and output switching section 1416. IP input/output section 1402 is primarily comprised of IP processing section 1421, header extracting section 1422, header interpreting section 1423, and IP registering section 1427.

IP input/output section 1406 has IP processing section 1461, and cable I/F section 1407 has cable communication section 1471.

Wireless I/F section 1401 performs wireless communications with the communication terminal apparatus, while performing the protocol processing on the physical layer and data link layer. The protocol processing includes radio packet header processing and physical wireless transmission processing. Wireless I/F section 1401 interprets the L2 relay field in the header of a radio packet, and when there is an instruction for performing the L2 relay, transfers SDU (data unit corresponding to an IP packet or ICMP packet) to cable I/F section 1407 through L2 relay section 1408. At this point, L2 relay section 1408 designates as a destination of the packet a default gateway of the network connected to cable I/F section 1407. When there is no L2 relay instruction, wireless I/F section 1401 transfers SDU to IP input/output section 1402.

Cable I/F section 1407 communicates with the cable network, and performs all the protocol processing associated with communications between adjacent nodes on the cable network. For example, cable I/F section 1407 corresponds to a media transmission protocol (such as Ethernet) processing section. The protocol processing includes header processing, division and composing of SDU and transmission processing on the physical layer and data link layer.

IP input/output sections 1402 and 1406 performs communication processing on the network layer. IP input/output section 1402 has IP registering section 1427, and based on IP registering section 1427, IP relay section 1409 determines whether to transmit a packet to either wireless I/F section 1401 or cable T/F section 1407. When the logical network is the same on the sides of cable network and wireless network, in other words, when the cable network and wireless network use the same network prefix, since IP registering section 1427 manages IP addresses of communication terminal apparatuses existing over the wireless network, it is possible to control the route properly and to save the network resource.

IP input/output section 1402 transfers the received IP packet to IP relay section 1409, while IP relay section 1409 outputs a packet to be transferred to cable I/F section 1407 to IP input/output section 1406. IP input/output section 1406 transfers the received IP packet to IP relay section 1409, while IP relay section 1409 outputs a packet to be transferred to wireless I/F section 1401 to IP input/output section 1402.

Herein, the wireless network is used in the communication between the communication terminal apparatus and base station 2700, while the cable network is used in the communication between adjacent nodes and base station apparatus 2700.

IP relay section 1409 relays a packet between IP input/output sections 1402 and 1406.

The operation will be described below of each block on the physical and data link layer of OSI Reference Model in base station apparatus 2700.

Wireless communication section 1411 receives a radio signal transmitted from the communication terminal apparatus, amplifies the radio signal, converts the signal into the signal of baseband frequency, demodulates and decodes the signal, and outputs the decoded packet (received signal) to header extracting section 1412 and composing section 1415. Wireless communication section 1411 further performs coding on a packet (transmit signal) output from IP input/output section 1402 that performs the processing on the network layer, modulates the signal, converts the signal into the signal of radio frequency, amplifies the signal, and transmits the radio signal to the communication terminal apparatus.

Header extracting section 1412 extracts a radio packet header from the packet to output to header interpreting section 1413. Header interpreting section 1413 interprets the radio packet header, determines whether the radio packet header contains information for instructing the relay on the data link layer, and outputs the determination to output destination control section 1414.

When the determination in header interpreting section 1413 is indicative of the instruction on the relay on the data link layer, output destination control section 1414 instructs output switching section 1416 to output the packet to L2 relay section 1408. When the determination in header interpreting section 1413 is not indicative of the instruction on the relay on the data link layer, output destination control section 1414 instructs output switching section 1416 to output the packet to IP input/output section 1402.

Composing section 1415 composes divided packets transmitted from the communication terminal apparatus, and extracts L2 SDU (that corresponds to an IP packet) to output to output switching section 1416. Unit data to transfer to L2 relay section 1408 is of an IP packet, but a radio packet payload is shorter than transmit data, and therefore composing section 1415 composes the packets.

According to the instruction of output destination control section 1414, output switching section 1416 outputs the packet to either IP input/output section 1402 or L2 relay section 1408. L2 relay section 1408 relays the packet output from output switching section 1416 to output to cable communication section 1471 of cable I/F section 1407.

Cable communication section 1471 outputs the packet output from IP input/output section 1406 or L2 relay section 1408 to the cable network, while receiving a packet output from the cable network to output to IP processing section 1461.

Thus, according to the base station apparatus of this embodiment, the communication terminal apparatus adds an instruction for relaying a packet on the data link layer to a header of the packet to transmit, while the base station apparatus interprets the header of the packets and relays the packet on the data link layer, whereby the need is eliminated of performing processing on or above the transport layer, and it is thereby possible to reduce the overhead and to shorten a packet transmit time.

In addition, it may be possible for Base Station 2700 to relay IP packets between the wireless link and the cable link without IP register section 1427, where subnets assigned on the wireless I/F and the cable I/F are different, in other word, the Base Station 2700 performes entirely IP router The base station apparatus of this embodiment is applicable to both cases that the same network is used over a cable network and a wireless and that different subnets are used respectively over a cable network and wireless network. Further, the base station apparatus does not need to be always provided with IP registering section 1427.

As described above, according to the present invention, it is possible to provide a base station apparatus, mobile terminal apparatus and wireless access system using the apparatuses capable of eliminating overhead in changing an IP address in a wireless internet access, improving a throughput, and reducing a processing time required to change an IP address due to handover or the like.

The present invention is not limited to the above described embodiments, and various variations and modifications may be possible without departing from the scope of the present invention.

This application is based on the Japanese Patent Application No.2000-344788 filed on Nov. 13, 2000 and the Japanese Patent Application No.2001-331738 filed on Oct. 29, 2001, entire content of which is expressly incorporated by reference herein.

What is claimed is:

1. A base station apparatus having a wireless interface and a cable interface and relaying communications between a mobile terminal apparatus and the internet, the base station apparatus comprising:

a protocol relay section that performs proxy processing;

a protocol processing section that performs normal protocol processing and relay processing without involving proxy processing;

a first output destination controller that detects an instruction from the mobile terminal apparatus from the relay packet, selects one of the protocol relay section and the protocol processing section in accordance with the detected instruction, and instructs packet processing to the mobile terminal apparatus.

2. The base station apparatus of claim 1, wherein the instruction from the mobile terminal apparatus is described in an upper transfer field in a header of the relay packet.

3. The base station apparatus of claim 2, wherein the header of the relay packet is associated with a layer 2.

4. The base station apparatus of claim 1, wherein the protocol relay section performs proxy processing on a transport layer, and wherein the protocol processing section performs protocol processing on a network layer.

5. The base station apparatus of claim 1, wherein the protocol relay section performs proxy processing on at least one of a transport layer and a network layer, and wherein the protocol processing section performs protocol processing on a data link layer.

6. The base station apparatus of claim 1, further comprising:

a L2 relay section that performs relay processing on a data link layer; and a second output destination controller that selects one of transfer to the L2 relay section and transfer to an upper layer corresponding to a type of the relay packet, wherein when the second output destination controller selects transfer to the upper layer, the first output destination controller selects one of the protocol relay section and the protocol processing section in accordance with the detected instruction.

7. A mobile terminal apparatus comprising:

a header setting section that adds to a header an instruction for relaying the relay packet to the base station apparatus of claim 1, on a layer; and a wireless communication section that transmits the relay packet including the header.

8. The mobile terminal apparatus of claim 7, wherein the instruction for the layer for packet relay processing instructs a relay on a data link layer.

9. The mobile terminal apparatus of claim 7, wherein the instruction for the layer for packet relay processing instructs a relay on a transport layer.

10. The mobile terminal apparatus of claim 7, wherein the instruction for the layer for the packet relay processing is described in an upper transfer field in the header.

11. A wireless access system comprising a mobile terminal apparatus and a base station apparatus that relays communications between the mobile terminal apparatus and the internet, the mobile terminal apparatus comprising:

a header setting section that adds to a header an instruction for relaying a relay packet on a layer; and a wireless communication section that transmits a relay packet including the header, the base station apparatus comprising:

a protocol relay section that performs proxy processing;

a protocol processing section that performs normal protocol processing and relay processing without involving proxy processing; and an output destination controller that selects one of the protocol relay section and the protocol processing section based on the instruction described in the header of the relay packet, and instructs packet processing to the mobile terminal apparatus.

* * * * *

UNITED STATES PATENT AND TRADEMARK OFFICE
CERTIFICATE OF CORRECTION

PATENT NO.         : 7,209,480 B2                                        Page 1 of 1
APPLICATION NO. : 09/986826
DATED              : April 24, 2007
INVENTOR(S)        : Shinkichi Ikeda It is certified that error appears in the above-identified patent and that said Letters Patent is hereby corrected as shown below:

On the title page Item (30), Foreign Application Priority Data, "2000-331738" should be --2001-331738--.

At column 28, line 28 (claim 1, line 10) of the printed patent, "the relay" should be --a relay--.

Signed and Sealed this

Fifteenth Day of April, 2008

JON W. DUDAS
*Director of the United States Patent and Trademark Office*